US007423771B2

(12) United States Patent
Ohata et al.

(10) Patent No.: US 7,423,771 B2
(45) Date of Patent: Sep. 9, 2008

(54) ON-DEMAND IMAGE DELIVERY SERVER, IMAGE RESOURCE DATABASE, CLIENT TERMINAL, AND METHOD OF DISPLAYING RETRIEVAL RESULT

(75) Inventors: Tadahiro Ohata, Kanagawa (JP); Keiko Abe, Kanagawa (JP); Yasushi Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 09/904,317

(22) Filed: Jul. 12, 2001

(65) Prior Publication Data

US 2002/0048054 A1    Apr. 25, 2002

(30) Foreign Application Priority Data

Jul. 13, 2000 (JP) ............................. 2000-213255

(51) Int. Cl.
*G06F 15/00* (2006.01)
*H04N 1/00* (2006.01)
*H04N 1/40* (2006.01)

(52) U.S. Cl. ........................ 358/1.15; 358/403; 358/444

(58) Field of Classification Search ................ 358/1.15, 358/402, 442, 400, 1.1, 1.17, 1.13, 403, 444
See application file for complete search history.

(56) References Cited

U.S. PATENT DOCUMENTS

| | | | | |
|---|---|---|---|---|
| 5,612,881 A | * | 3/1997 | Moroto et al. ............... 701/209 |
| 5,664,109 A | * | 9/1997 | Johnson et al. ................. 705/2 |
| 5,787,383 A | * | 7/1998 | Moroto et al. ............... 701/210 |
| 5,819,286 A | * | 10/1998 | Yang et al. ...................... 707/1 |
| 5,826,270 A | * | 10/1998 | Rutkowski et al. ............. 707/10 |
| 5,893,053 A | * | 4/1999 | Trueblood ................... 702/187 |
| 5,928,306 A | * | 7/1999 | France et al. ............... 701/207 |
| 5,946,687 A | * | 8/1999 | Gehani et al. ................. 707/10 |
| 5,948,040 A | * | 9/1999 | DeLorme et al. ............ 701/201 |
| 5,987,345 A | * | 11/1999 | Engelmann et al. ......... 600/407 |
| 5,991,807 A | * | 11/1999 | Schmidt et al. ............. 709/225 |
| 6,028,603 A | | 2/2000 | Wang et al. |

(Continued)

FOREIGN PATENT DOCUMENTS

JP    10 233985    9/1998

(Continued)

OTHER PUBLICATIONS

Anonymous: "Distributed image storage and retrieval system for a local area network" Research Disclosure, Kenneth Mason Publications, Hampshire, GB, vol. 326, No. 27, Jun. 1991, XP007116470 ISSN: 0374-4353

*Primary Examiner*—Madeleine A Nguyen
(74) *Attorney, Agent, or Firm*—Frommer Lawrence & Haug LLP; William S. Frommer; Thomas F. Presson

(57) ABSTRACT

On-demand image delivery server delivering designated image data based on a request from a client terminal with one or a plurality of retrieval items as a retrieval condition inputted from the client terminal, made up by a retrieval function portion, which retrieves one or a plurality of image resource databases, and a retrieval result displaying function portion, which displays on the screen of the client terminal for confirmation of contents of image data subject to delivery, simplified image data of the image data matching a retrieval condition and/or data regarding attached contents-related information.

15 Claims, 20 Drawing Sheets

U.S. PATENT DOCUMENTS

| | | | | |
|---|---|---|---|---|
| 6,108,554 | A * | 8/2000 | Kawamoto | 455/456.5 |
| 6,133,947 | A * | 10/2000 | Mikuni | 348/143 |
| 6,167,441 | A * | 12/2000 | Himmel | 709/217 |
| 6,191,704 | B1 * | 2/2001 | Takenaga et al. | 340/903 |
| 6,199,014 | B1 * | 3/2001 | Walker et al. | 701/211 |
| 6,199,015 | B1 * | 3/2001 | Curtwright et al. | 701/213 |
| 6,212,475 | B1 * | 4/2001 | France et al. | 701/214 |
| 6,222,583 | B1 * | 4/2001 | Matsumura et al. | 348/113 |
| 6,307,641 | B1 * | 10/2001 | Hamano et al. | 358/1.15 |
| 6,314,295 | B1 * | 11/2001 | Kawamoto | 455/456.2 |
| 6,314,370 | B1 * | 11/2001 | Curtright | 701/213 |
| 6,321,158 | B1 * | 11/2001 | DeLorme et al. | 701/201 |
| 6,330,576 | B1 * | 12/2001 | Mochizuki et al. | 715/529 |
| 6,405,034 | B1 * | 6/2002 | Tijerino | 455/414.3 |
| 6,437,797 | B1 * | 8/2002 | Ota | 345/638 |
| 6,442,538 | B1 * | 8/2002 | Nojima | 707/1 |
| 6,487,493 | B2 * | 11/2002 | Wekawa et al. | 701/200 |
| 6,507,371 | B1 * | 1/2003 | Hashimoto et al. | 348/552 |
| 6,542,819 | B1 * | 4/2003 | Kovacs et al. | 701/213 |
| 6,590,640 | B1 * | 7/2003 | Aiken et al. | 356/3.01 |
| 6,636,803 | B1 * | 10/2003 | Hartz et al. | 701/208 |
| 6,650,647 | B1 * | 11/2003 | Ishikawa et al. | 370/400 |
| 6,658,389 | B1 * | 12/2003 | Alpdemir | 704/275 |
| 6,665,442 | B2 * | 12/2003 | Sekiguchi et al. | 382/224 |
| 6,684,255 | B1 * | 1/2004 | Martin | 709/231 |
| 6,703,947 | B1 * | 3/2004 | Wallner | 341/50 |
| 6,704,024 | B2 * | 3/2004 | Robotham et al. | 345/581 |
| 6,741,790 | B1 * | 5/2004 | Burgess | 386/46 |
| 6,748,383 | B1 * | 6/2004 | Wada et al. | 707/10 |
| 6,762,860 | B1 * | 7/2004 | Watanabe et al. | 358/403 |
| 6,789,102 | B2 * | 9/2004 | Gotou et al. | 709/203 |
| 6,801,340 | B1 * | 10/2004 | Endo | 358/403 |
| 6,810,323 | B1 * | 10/2004 | Bullock et al. | 701/206 |
| 6,826,403 | B1 * | 11/2004 | Minborg et al. | 455/445 |
| 6,920,488 | B1 * | 7/2005 | Le Pennec et al. | 709/219 |
| 6,928,424 | B2 * | 8/2005 | Honda | 707/1 |
| 6,983,314 | B1 * | 1/2006 | Yoneda | 709/219 |
| 6,996,402 | B2 * | 2/2006 | Logan et al. | 455/456.1 |
| 7,024,208 | B2 * | 4/2006 | Kaise | 455/456.3 |
| 7,031,729 | B2 * | 4/2006 | Kawamoto | 455/456.6 |
| 7,031,965 | B1 * | 4/2006 | Moriya et al. | 707/10 |
| 7,046,838 | B1 * | 5/2006 | Sakagawa et al. | 382/154 |
| 7,054,741 | B2 * | 5/2006 | Harrison et al. | 701/208 |
| 2001/0039541 | A1 * | 11/2001 | Okawa | 707/3 |
| 2001/0054041 | A1 * | 12/2001 | Chang | 707/5 |
| 2002/0099499 | A1 * | 7/2002 | Takayama et al. | 701/200 |
| 2002/0109859 | A1 * | 8/2002 | Tipimeni | 358/1.15 |
| 2002/0112003 | A1 * | 8/2002 | Glorikian | 709/203 |
| 2003/0060211 | A1 * | 3/2003 | Chern et al. | 455/456 |
| 2004/0250083 | A1 * | 12/2004 | Schwab | 713/182 |

FOREIGN PATENT DOCUMENTS

WO      WO 00 33575      6/2000

\* cited by examiner

FIG.8

| | | |
|---|---|---|
| TITLE | SPEED AND DIRECTION OF POSITION CHANGE OF EQUIPMENT | STREET NAME |
| TYPE OF TITLE | SPEED AND DIRECTION OF ABSOLUTE POSITION CHANGE OF EQUIPMENT | TOWN NAME |
| MAIN SUBJECT | SPEED OF EQUIPMENT MOVEMENT | CITY NAME |
| SUPPLEMENTARY SUBJECT | DIRECTION OF EQUIPMENT | STATE NAME |
| SERIES NO. | RELATIVE SPEED AND DIRECTION OF POSITION CHANGE OF EQUIPMENT | ZIP CODE |
| EPISODE NO. | RELATIVE SPEED OF EQUIPMENT | COUNTRY NAME |
| SCENE NO. | RELATIVE DIRECTION OF EQUIPMENT | DATE AND TIME INFORMATION |
| TAKE NO. | SPEED AND DIRECTION OF POSITION CHANGE OF OBJECT | ABSOLUTE DATE AND TIME INFORMATION |
| BROADCASTER | ABSOLUTE SPEED AND DIRECTION OF POSITION CHANGE OF OBJECT | DATE AND TIME OF PRODUCTION START |
| BROADCASTING AREA | ABSOLUTE SPEED OF OBJECT | DATE AND TIME OF PRODUCTION END |
| TALENT, STAFF OR THE LIKE | ABSOLUTE DIRECTION OF OBJECT | DATE AND TIME OF SEGMENT START |
| PROGRAM TYPE | RELATIVE SPEED AND DIRECTION OF POSITION CHANGE OF OBJECT | DATE AND TIME OF SEGMENT END |
| GENRE | RELATIVE SPEED OF OBJECT | DATE AND TIME OF MEDIA START |
| ORIENTED TO | RELATIVE DIRECTION OF OBJECT | DATE AND TIME OF MEDIA END |
| THEME | ANGLE INFORMATION | DATE AND TIME OF SEGMENT START |
| KEY WORD | ANGLE OF EQUIPMENT | DATE AND TIME OF SEGMENT END |
| KEY FRAME | SENSOR'S ROLL ANGLE | DATE AND TIME OF CREATION |
| KEY SOUND | DIVERGENT ANGLE FROM NORTH | DATE AND TIME OF FINAL CHANGE |
| KEY DATA | ANGLE OF INCLINE | DATE AND TIME OF EVENT |
| OUTLINE | RELEVANT ANGLE | ABSOLUTE DATE AND TIME OF EVENT |
| PURPOSE | DISTANCE BETWEEN EQUIPMENT AND OBJECT | DATE AND TIME OF EVENT START |
| EXPLANATION | ANGLE WITH OBJECT | DATE AND TIME OF PROJECT START |
| COMMENTARY | PLACE NAME | DATE AND TIME OF SCENE START |
| TRANSLATION | COUNTRY CODE | DATE AND TIME OF SHOOTING START |
| CONTENTS GROUP | CODE OF COUNTRY DEPICTED | DATE AND TIME OF SCENE END |
| EXPLANATION OF CONTENTS | CODE OF COUNTRY OF SHOOTING | DATE AND TIME OF RECORDING END |
| EXPLANATION OF ESSENCE | CODE OF COUNTRY OF SETTING | DATE AND TIME OF BROADCASTING END |
| EXPLANATION OF SEGMENT | COUNTRY NAME, AREA NAME | |
| LONGITUDE OF EQUIPMENT | NAME OF AREA TO BE COVERED IN DEPICTION | |
| LATITUDE OF EQUIPMENT | NAME OF SHOOTING AREA | |
| ABSOLUTE VALUE OF OBJECT | SHOOTING ADDRESS | |
| RELATIVE POSITION OF OBJECT | ROOM NO. | |
| SPEED AND DIRECTION OF POSITION CHANGE | LOT NO. OR BUILDING NAME | |

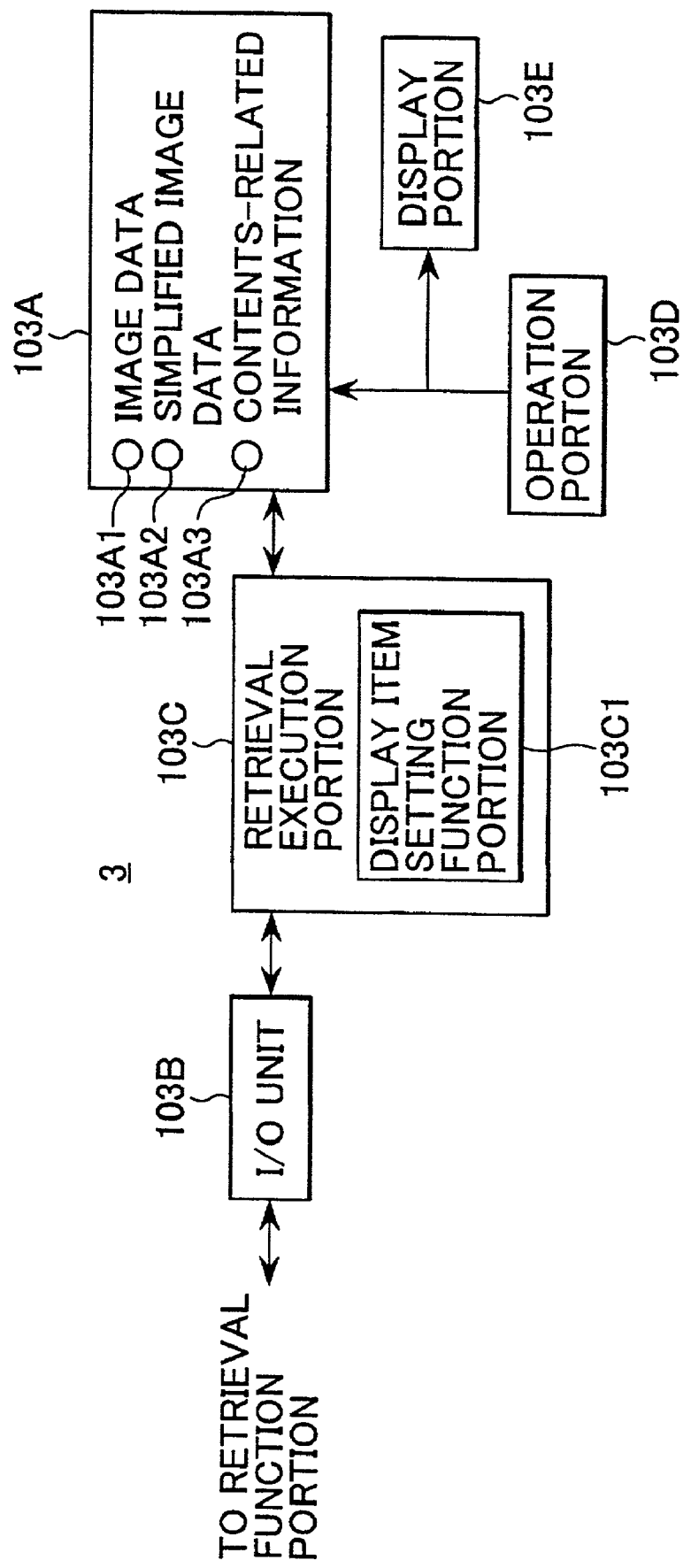

FIG.14

| DATE AND TIME | PLACE | OBJECT | SITUATION | SHOOTING METHOD | . . . . |

| HOKKAIDO | AOMORI | . . . . | TOKYO | . . . . |

| SHINJUKU WARD | TOSHIMA WARD | SHIBUYA WARD | . . . . |

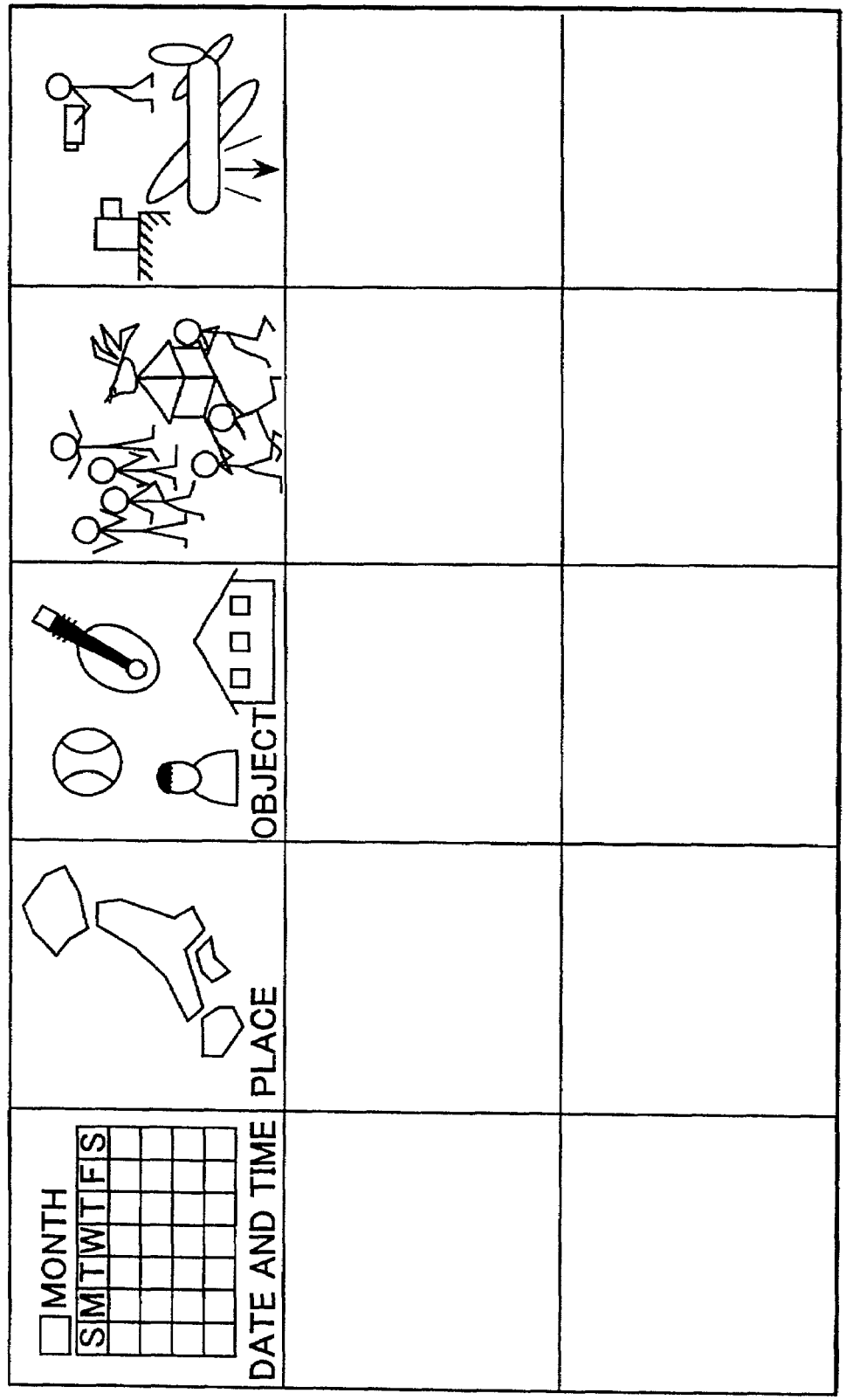

FIG.17

RETRIEVAL RESULT KANDA

| DATE AND TIME | PLACE | OBJECT | SITUATION | METHOD | TAPE ID | Shot No |
|---|---|---|---|---|---|---|
| 19990828 | KANDA | PORTABLE SHRINES | FESTIVAL | HAND-CARRIED | 023165 | 00123 |
| 19940611 | KANDA | KANDA STATION | CROWD | HAND-CARRIED | 001221 | 00051 |
| 19991110 | KANDA | KANDA TARO | AUTOGRAPH SESSION | FIXED | 038437 | 00089 |
| 19981215 | KANDA | SKI SHOP | CROWD | CRANE | 013763 | 00153 |
| 19980423 | KANDA | ACCIDENT SITE | AUTO ACCIDENT | AERIAL SHOOTING | 009832 | 00052 |

21 RETRIEVAL ITEM BOX (DATE AND TIME, PLACE)
22 CONTENTS RELATED INFORMATION BOX (OBJECT, SITUATION, METHOD, TAPE ID, Shot No)

23 CONFIRMATION  24 CANCEL  25 EXECUTION

FIG.18

RETRIEVAL RESULT KANDA

| SAMPLE | DATE AND TIME | PLACE | OBJECT | SITUATION | METHOD | TAPE ID | Shot No |
|---|---|---|---|---|---|---|---|
| | 19990828 | KANDA | PORTABLE SHRINES | FESTIVAL | HAND-CARRIED | 023165 | 00123 |
| | 19940611 | KANDA | KANDA STATION | CROWD | HAND-CARRIED | 001221 | 00051 |
| | 19991110 | KANDA | KANDA TARO | AUTOGRAPH SESSION | FIXED | 038437 | 00089 |
| | 19981215 | KANDA | SKI SHOP | CROWD | CRANE | 013763 | 00153 |
| | 19980423 | KANDA | ACCIDENT SITE | AUTO ACCIDENT | AERIAL SHOOTING | 009832 | 00052 |

[CONFIRMATION] 23  [CANCEL] 24  [EXECUTION] 25

21, 22

ON-DEMAND IMAGE DELIVERY SERVER, IMAGE RESOURCE DATABASE, CLIENT TERMINAL, AND METHOD OF DISPLAYING RETRIEVAL RESULT

BACKGROUND OF THE INVENTION

1. Field of the Invention

This invention relates to a client terminal, which includes a computer terminal, a personal digital assistant, a set-top box, a television receiver, other home electric appliances, and, if necessary, any other on-demand image delivery server when viewed from an applicable server, an on-demand image delivery server delivering, according to a request of the client terminal, any desired image data including static images (regardless of actual taken images or computer-generated images; the same applies to motion pictures), motion pictures, and other images to which audio information is provided, and an image resource database storing image data. It also relates to a method of displaying a retrieval result in an on-demand image delivery system composed of an on-demand image delivery server, an image resource database, and a client server.

2. Description of the Related Art

Nowadays there is available an immensity of image data resources everywhere in the world. For example, broadcasting business operators and picture production companies possess enormous image data resources including those already broadcast, while libraries, schools, art galleries, research organizations or the like possess massive image data resources.

It should be noted that such image data resources are under the management of each owner, and data is neither made public nor its utilization is necessarily sufficiently well employed. Although a variety of potential needs exist, most of the resources are left idle.

Also, lately, it is possible to record large volumes of accessory information with the image data. One of these kinds of data formats includes a meta data format (unified standards of some few hundred items). Consequently, providing services that make effective use of the accessory information is extremely important from the standpoint of increasing the utilization value of the image data resources.

SUMMARY OF THE INVENTION

It is therefore an object of the present invention to provide an on-demand image delivery server, an image resource database, a client terminal, and a method of displaying a retrieval result, which can retrieve, display and otherwise make effective use of huge volumes of image data in image data resources available in many parts of the world.

It is another object of the present invention to provide an on-demand image delivery server, an image resource database, a client terminal, and a method of displaying a retrieval result, which can curtail the transfer volumes of image data in contribution to increasing the data processing rate by eliminating any unnecessary image data from data transfer.

It is a further object of the present invention to provide an on-demand image delivery server, an image resource database, a client terminal, and a method of displaying a retrieval result, which makes it possible not to display any undesirable image data at the display stage.

It is a still further object of the present invention to provide an on-demand image delivery server, an image resource database, a client terminal, and a method of displaying a retrieval result, which makes it possible to perform mapping of any point on a map with poinpointing accuracy by using GPS information and retrieve the image data at the specific position at the specific time.

(1) According to the present invention, there is proposed an on-demand client server delivering desired image data (for example, image data of television broadcasting programs, image data recorded in various places, and image data such as scenery and art objects) based on requests from client terminals (including non-on-demand image delivery business operators (e.g., household users) as well as other on-demand image delivery business operators) comprising a retrieval function portion retrieving one or a plurality of image resource databases (e.g., regardless of image resource databases of the operators offering on-demand image delivery service, including image resource databases of other operators, a plurality of image resource databases being not limited to those belonging to the same operator) with the retrieval condition of one or a plurality of retrieval items (e.g., the date and time (imaging/shooting date and time, editing date and time, broadcasting date and time or the like), position information, objects, titles or the like) inputted from client terminals; and a retrieval result display function portion displaying on the screen of the client terminal a view (regardless of a table form or mapping form) of simplified image data (data having less data volume than the image data proper which is prepared beforehand separately from the image data proper or created from the image data proper, including especially portions of images of a principal unit in case of a motion picture) and/or data regarding designated items (including all) among contents-related information attached to the image data (e.g., location, object, situation, and shooting method) matching the retrieval condition for confirmation of the contents of the image data subject to delivery.

Use of the aforementioned on-demand image delivery server enables the client terminal user to retrieve any desired image data easily from the massive image data resources and download it as necessary.

In addition, since the on-demand image delivery server provides, as retrieval results, simplified image data of the image data, contents-related information attached to the image data or contents-related information attached to the simplified image data and the image data, the client server user can easily confirm the contents, even without looking at the image data itself, thus making it possible to verifying with certainty and acquiring the desired image data.

(2) It should be noted that the retrieval result display function portion described above determines the designated items based on the settings by the image resource database side.

In such case, curtailment of the volume of data to be transferred is accomplished, as the items that are definitely not to be displayed can be excluded from the transfer data, thereby enabling these items to be employed to reduce the volume of data which are to be transmitted from the image resource database side to the on-demand image delivery server. Likewise, the items can be used to reduce the volume of data to be delivered from the on-demand image delivery server side to the client terminal. It is important that the further advantage of such arrangement is that by reducing the volume of data to be transferred, the volume of data to be processed at the on-demand image delivery server and the client terminal are reduced, and, as a result, an efficient utilization of the information processing resources is realized, with another benefit of improving visibility from the display of the client terminal.

Furthermore, the setting items at the database side can be not only the items set by the image resource database administrator (business operator) but also those items designated beforehand for delivery to the image resource database administrator oneself as well as the items requested in advance by the client terminal side.

For example, by making it possible for settings to be made by the image resource database administrator (business operator), the information not desired by the image resource database administrator (business operator) can be excluded from issuing out to the on-demand image delivery server and the client terminal. Also, by making it possible for designations to be made from the on-demand image delivery server side, it is possible to reflect the originality of the server business operator offering the on-demand image delivery service in the display of views, thereby realizing differentiation from other server business operators. When requests from the client terminal side are made possible, an improvement of the user's retrieval work for further retrieving from the retrieval result can be realized. Further, the settings from the client terminal side are tantamount to consciously capable of excluding delivery of specified images and contents information. That is, according to the client terminal of a preferred embodiment of the present invention, an arrangement can be made whereby any undesired information (e.g., adult information or the like) can not be displayed even at the display stage of the retrieval result.

Moreover, the designated or set items mentioned above can be those items that display the past designated or setting histories (histories of the last few months, histories of specified objects and clients, histories of specified groups or the like) of high frequency. This will enable the client to obtain information conveniently.

(3) Also, the retrieval result display function portion described in (1) above determines the designated items based on the settings in its own device (i.e., in the on-demand image delivery server).

In this instance, since those items certainly not to be displayed can be excluded from the transfer data, they serve to reduce volume of data delivered from the on-demand image delivery server side to the client terminal. Also, as the volume of data to be transferred decreases, the data processing volumes at the on-demand image delivery server and the client terminal can be reduced, thereby realizing effective utilization of the information processing resources and improving visibility from the screen of the client terminal.

Further, the setting items in its own device can be not only those items set by the on-demand image delivery server administrator (business operator) but also the items designated beforehand by the image resource database administrator (business operator) in the on-demand image delivery server which is the delivery destination, and the items requested beforehand from the client terminal side.

The importance of such aspect is apparent in that, for example, by making it possible for designations to be made from the image resource database administrator (business operator) side, the information not desired by the image resource database administrator (business operator) can be excluded from issuing out to the client side. Also, by making it possible for settings to be made by the on-demand image delivery server administrator (business operator), it is possible to reflect the originality of the server operator offering the on-demand image delivery service in the display of views, realizing differentiation from other server business operators. When requests from the client terminal side are made possible, an improvement of the user's retrieval work for further retrieving from the retrieval result can be realized as well. Moreover, the settings from the client server side are tantamount to consciously capable of excluding delivery of specified images and contents information. That is, in the client terminal according to a preferred embodiment of the present invention, an arrangement can be made not to display any undesired information (e.g., adult information or the like) even at the display stage of the retrieval result.

It has to be noted that the designated or set items mentioned above can be those items which display the past designated or setting histories (histories of the previous few months, histories of specified objects and clients, histories of specified groups or the like) of high frequency. This will enable the client to obtain information easier to use.

(4) In addition, the retrieval result display function portion described in (1) above determines the designated items based on the settings of the client terminal side.

In this case, the items certainly not to be displayed can be excluded from the transfer data, and the data processing volumes at the client terminal can be reduced, thus realizing effective utilization of the information processing resources and improving visibility from the screen of the client terminal.

It should be noted that the setting items in the client terminal side can be not only those items set by the client terminal user but also the items designated by the image resource database administrator (business operator) and the on-demand image delivery server administrator (business operator).

For example, the settings made in this manner from the client terminal side are tantamount to conscious capability of excluding delivery of specified images and contents information. That is, according to the client terminal of this invention, an arrangement can be made not to display any undesired information (e.g., adult information or the like) even at the display stage of the retrieval result. Also, by making it possible for designations to be made by the image resource database administrator (business operator) side, the information not desired by the image resource database administrator (business operator) can be excluded from issuing out to the client side. Also, by making it possible for settings to be made by the on-demand image delivery server administrator (business operator), it is possible to reflect the originality of the server business operator offering the on-demand image delivery service in the display of views, and differentiation from other server business operators can be realized.

Moreover, the designated or set items mentioned above can be those items that display the past designated or setting histories (histories of the last few months, histories of specified objects and clients, histories of specified groups or the like) of high frequency. This enables the client to obtain information easier to use.

(5) Also, it is proposed that in the on-demand image delivery server described in any of (1) through (4), at least GPS (Global Positioning System) information (including time information, position information (including not only longitude and latitude but also altitude information)) be contained in the aforementioned contents-related information.

A further advantage is obtained by including the GPS information in such manner, inasmuch as the image of a specific position at a specific time can be pinpointed and retrieved. Especially, the inclusion of the altitude information makes it possible to extract easily the most suitable image data at the desired altitude at the specific position so long as the data exists; for example, the desired data can be extracted with a pinpointing accuracy to the extent of, say the image data of a high-rise building on the ground, the image data of a medium level floor, and the rooftop image data.

Also, the inclusion of the GPS information makes it possible to map onto the image data on the map.

(6) It is further proposed that the on-demand image delivery server described in any of (1) through (4) be the one capable of delivering image data to a client terminal separate and distinct from the client terminal which issued said retrieval request according to the request of the client terminal issuing the retrieval request.

By making the delivery possible in such manner, for example, even if a portable type client terminal (portable telephone, PDA—personal digital assistant or the like) should be used for retrieving image data, a separate client terminal having a large capacity storage medium (desktop computer, set-top box or the like) can be set as the final storage destination of image data.

(7) It is also proposed that position information (e.g., three-dimensional information on longitude, latitude, and altitude) and/or time information is to be included in one or a plurality of retrieval items inputted from the client terminal described in (1).

The inclusion of the information makes it possible to pin-point and retrieve the image data at the specific position at the specific time. For instance, by including the altitude information, the most suitable image data at the desired altitude at the specific position can be easily extracted so long as the data exists; for instance, the desired data can be extracted with a pinpointing accuracy to the extent of, say the image data of a high-rise building on the ground, the image data of a medium level floor, and the rooftop image data.

(8) It is further proposed that the on-demand image delivery server described in (1) above be the one which maps the simplified image data of the image data (in case there are a great number of them involved, a representative one out of the many can be shown or these images can be displayed by turns) matching the retrieval condition to the relevant position on the map, by its accessory GPS information (time information and position information (including altitude information)), and displays the mapping result on the screen of the client terminal.

By making the display possible in such manner, while confirming the geographical position relationship, the client terminal user can retrieve necessary image data, so that especially when one has an approximate idea of the location of a place, this is especially effective for retrieving the image data of the place, even though one does not have a detailed knowledge of its location.

(9) It is also proposed that the on-demand image delivery server described in (1) above displays contents-related information of each image data according to a matrix form corresponding to the items subject to display.

Use of the display described above enables the user to ascertain a difference of contents-related information attached to each image data in such a manner that allows comparison. For example, assuming that the item to be retrieved is a specific scene, since it is possible to determine what item is different within the information attached to each image data, even in the case where there is numerous image data of the same kind, access to the kind of information one needs can be easily done. A case in question is that the difference of each image data such as different information about the shooting point, different date and time of shooting, and a different weather can be grasped in terms of a difference in information recorded with respect to the common items. Moreover, this method is also effective when the contents-related information is shown with a tag indicating the contents of information such as XML (extensible Markup Language) and SGML (Standard Generalizing Markup Language).

(10) There is proposed an on-demand resource database storing image data (e.g., images of television broadcasting programs, image data recorded in various places, and image data of scenery and art objects), together with its simplified data (data having less data volume than the image data proper which is prepared beforehand separately from the image data proper or created from the image data proper, including especially portion of the images of the principal unit in case of motion pictures) and/or contents-related information (e.g., location, object, situation, and shooting method) attached thereto, comprising a retrieval execution portion outputting, when responding to the on-demand image delivery server regarding the retrieval result, simplified image of the image data and/or only designated items (including all) from among the contents-related information attached thereto matching the retrieval condition.

Curtailment of the volume of information is a benefit of using the image resource database described above in that, it is possible to reduce the volume of data transmitted from the image resource database to the on-demand image delivery server. Likewise, the volume of data transmitted from the on-demand image delivery server to the client terminal can be reduced. Further, as a result, it is possible to reduce the data processing volumes in the on-demand image delivery server and the client terminal, thus realizing effective utilization of the information processing resources and improving the visibility from the screen of the client terminal due to the reduction in the number of items.

Moreover, as the designated items that permit outputting, there can be used a method of determination based on the settings in its own device (i.e., in the image resource database), a method of determination based on the settings of the on-demand image delivery server side, or a method of determination based on the settings of the client terminal side.

It should be noted that in the case of using any of these methods, as described above with respect to the on-demand image delivery server, there can be not only the case where the business operator of each device and the user make settings but also the case where the business operators of other devices and users make settings. For example, when a decision is to be made based on the setting of the image resource database itself, that setting itself can be not only the one set by the image resource database business operator but also the one set by the on-demand image server business operator and the client terminal user.

Also, in regard to setting the setting items, those items that display the past designated or setting histories of high frequency can be shown as in the case of the on-demand image delivery server.

(11) There is proposed a client terminal receiving information about the image data (for example, image data of television broadcasting programs, image data recorded in various places, and image data such as scenery and art objects) matching the retrieval condition from the on-demand image delivery server and displaying a view of the information on the screen, comprising a retrieval result display function portion outputting on the screen simplified image data of the image data server (data having less data volume than the image data proper which is prepared beforehand separately from the image data proper or created from the image data proper, including especially portion of the images of the principal unit in case of motion pictures) and/or designated items (including all) among the contents-related information attached thereto (e.g., location, object, situation, and shooting method) which were notified from the above-mentioned on-demand image delivery.

Curtailment of the volume of information is a benefit of using the client terminal described above in that it is possible to reduce the volume of data transmitted from the image resource database to the on-demand image delivery server.

Likewise, the volume of data transmitted from the on-demand image delivery server to the client terminal can be reduced. Further, as a result, it is possible to reduce the data processing volumes in the image resource database and the on-demand image delivery server, thus realizing effective utilization of the information processing resources and improving visibility from the screen of the client server due to reduction in the number of items.

Moreover, as the designated items that permit outputting, there can be used a method of determination based on the settings in its own device (i.e., in the client terminal), a method of determination based on the settings of the image resources database, or a method of determination based on the settings of the on-demand image delivery server side.

It should be noted that in the case of using any of these methods, as described with respect to the on-demand image delivery server, there can be not only the case where the business operator and the user of each device make settings but also the case where the business operators of other devices and users make settings. For example, when a decision is to be made based on the setting of the client server itself, that setting itself can be not only the one set by the client server user but also the one set by the image resource database business operator and the on-demand image server business operator.

Also, in regard to setting the setting items, those items that display the past designated or setting histories of high frequency can be displayed as in the case of the on-demand image delivery server.

(12) As the server system, the system comprising any of the on-demand image delivery servers described in (1) through (9) and the image resource database described in (10) is proposed.

By configuring such server system, it becomes possible to provide a user friendly on-demand image delivery service with a high degree of freedom of display items of the retrieval result. Also, since it becomes possible to retrieve desired image data easily from enormous image resources, effective utilization of image resources can be made.

(13) An on-demand image delivery system comprising an on-demand image delivery server described in any of (1) through (9) and a client terminal described in (11) is proposed.

By configuring such on-demand image delivery system, it becomes possible to provide a user friendly on-demand image delivery service with a high degree of freedom of display items of the retrieval result. Also, since it becomes possible to retrieve desired image data easily from the enormous image resources, effective utilization of image resources can be made.

(14) There is proposed a retrieval result display method in the on-demand image delivery system adapted to display on the screen of the client terminal a view of the simplified image data of the image data (data having less data volume than the image data proper which is prepared beforehand separately from the image data proper or created from the image data proper, including especially portion of the images of the principal unit in case of motion pictures) and/or data regarding the items which are set by the image resource database side from among the contents-related information attached thereto (e.g., location, object, situation, and shooting method) matching the retrieval condition.

In this retrieval method display method, not all the information saved in the image resource database but only those items set by the image resource database side are displayed, so that visibility with respect to the client terminal user can be improved and efficient retrieval processing can be executed.

Further, this means that the volume of data transmitted from the image resource database side to the on-demand image delivery server can be reduced. Likewise, it means that the volume of data delivered from the on-demand image delivery server side to the client terminal can be reduced. Also, the data processing volumes at the on-demand image delivery server and the client terminal can be reduced. As a result, effective utilization of the information processing resources can be realized.

Further, the items to be displayed as a view can be not only the items set by the image resource database administrator (business operator) but also those items designated beforehand by the on-demand image delivery server administrator for delivery to oneself and the items requested in advance by the client terminal side.

For example, by making it possible for settings to be made by the image resource database administrator (business operator), the information not desired by the image resource database administrator (business operator) can be excluded from issuing out to the on-demand image delivery server and the client terminal. Also, by making it possible for designations to be made from the on-demand image delivery server side, it is possible to reflect the originality of the server business operator offering the on-demand image delivery service in the display of views, and differentiation from other server business operators can be realized. Also, if requests from the client terminal side can be accepted, improvement of the retrieval work of the user further retrieving information can be realized. Further, since such settings from the client terminal side are tantamount to conscious capability of excluding delivery of the specified images and contents information, it is possible to make such an arrangement that undesired information (e.g., adult information or the like) can not be displayed even at the display stage of the retrieval result.

Moreover, as for the designated or set items mentioned above, those items which display the past designated or setting histories (histories of the last few months, histories of specified objects and clients, histories of specified groups or the like) of high frequency are acceptable, too. This enables the client to obtain information easier to use.

(15) There is proposed a retrieval result display method in the on-demand image delivery system adapted to display on the screen of the client terminal a view of the simplified image data of the image data (data having less data volume than the image data proper which is prepared beforehand separately from the image data proper or created from the image data proper, including especially portion of the images of the principal unit in case of motion pictures) and/or data regarding the items which are set by the on-demand image delivery server side among the contents-related information attached thereto (e.g., location, object, situation, and shooting method) matching the retrieval condition.

In this retrieval method display method, not all the information saved in the image resource database but only those items set by the one-demand image delivery server side are displayed, thereby improving visibility with respect to the client terminal user and executing efficient retrieval processing.

This further means that the volume of data transmitted from the on-demand image delivery server side to the client terminal can be reduced, and that the data processing volumes at the on-demand image delivery server and the client terminal can be reduced. Therefore, effective utilization of the information processing resources can be realized.

Further, the items to be displayed as a view can be not only the items set by the on-demand image delivery server administrator (business operator) but also those items designated beforehand by the image resource database administrator (business operator) at the on-demand image delivery server, which is the delivery destination, and the items requested beforehand by the client terminal side.

For example, there is a considerable advantage obtained by making it possible for designations to be made from the image resource database administrator (business operator) side, the information not desired by the image resource database administrator (business operator) can be excluded from issuing out to the client side. Additionally, by making it possible for settings to be made by the on-demand image delivery server administrator (business operator), it is possible to reflect the originality of the server business operator offering the on-demand image delivery service in the display of views, and differentiation from other server business operators can be realized. Moreover, if requests from the client terminal side can be accepted, improvement of the retrieval work of the user further retrieving information can be realized, whereas, since the settings made in this manner from the client terminal side are tantamount to conscious capability to exclude delivery of the specified images and contents information, it is possible to make such an arrangement that any undesired information (e.g., adult information or the like) can not be displayed even at the display stage of the retrieval result.

By the way, the designated or set items mentioned above can be those items that display the past designated or setting histories (histories of the last few months, histories of specified objects and clients, histories of specified groups or the like) of high frequency. This enables the client to obtain information easier to use.

(16) There is proposed a retrieval result display method in the on-demand image delivery system adapted to display on the screen of the client terminal a view of the simplified image data of the image data (data having less data volume than the image data proper which is prepared beforehand separately from the image data proper or created from the image data proper, including especially portion of the images of the principal unit in case of motion pictures) and/or data regarding the items which are set by the client terminal side among contents-related information attached thereto (e.g., location, object, situation, and shooting method) matching the retrieval condition.

In this retrieval result display method, not all the information saved in the image resource database but only those items set by the client terminal side are displayed, so that visibility with respect to the client terminal user can be improved, and efficient retrieval processing can be executed.

Further, this means that the volume of data processing at the client terminal can be reduced. As a result, effective utilization of the information processing resources can be realized.

Further, the items to be displayed in a view can be not only the items set by the client terminal user but also those items designated by the image resource database administrator (business operator) and the on-demand image delivery server administrator (business operator).

For example, since such settings from the client terminal side are tantamount to conscious capability of excluding delivery of the specified images and contents information, it is possible to make such an arrangement that undesired information (e.g., adult information or the like) can not be displayed even at the display stage of the retrieval result. Also, by making it possible for designations to be made from the image resource database administrator (business operator) side, the information not desired by the image resource database administrator (business operator) can be excluded from issuing out to the client side. Also, by making it possible for settings to be made by the on-demand image delivery server administrator (business operator), it is possible to reflect the originality of the server business operator offering the on-demand image delivery service in the display of views, and differentiation from other server business operators can be realized.

Further, the designated or set items mentioned above can be those items that display the past designated or setting histories (histories of the last few months, histories of specified objects and clients, histories of specified groups or the like) of high frequency. This enables the client to obtain information easier to use.

(17) There is proposed a retrieval result display method in the on-demand image delivery system adapted to display simplified image data of the image data and/or data regarding the designated item from among contents-related information attached thereto matching the retrieval condition in a view according to a matrix form made to match the items subject to display.

Use of the display method described above enables the user to ascertain a difference of contents-related information attached to each image data in such a manner that allows comparison. For example, assuming that the item to be retrieved is a specific scene, since it is possible to determine what item is different within the information attached to each image data, even in the case where there is numerous image data of the same kind, access to the kind of information one needs can be easily done. A case in question is that the difference of each image data such as different information about the shooting point, different date and time of shooting, and a different weather can be grasped in terms of a difference in information recorded with respect to the common items. Moreover, this method is also effective when the contents-related information is shown with a tag indicating the contents of information such as XML (eXtensible Markup Language) and SGML (Standard Generalizing Markup Language).

(18) There is proposed a retrieval result display method in the on-demand image delivery system adapted to display on the screen of the client terminal a mapping screen created by mapping the simplified image data of the image data matching the retrieval condition (data having less data volume than the image data proper which is prepared beforehand separately from the image data proper or created from the image data proper, including especially portion of the images of the principal unit in case of motion pictures) to the relevant position on the map by using its accessory GPS information (time information and position information (including altitude information).

In this retrieval result display method, the client terminal user can, while confirming the geographical position relationship, retrieve necessary image data, so that especially when one has an approximate idea of the location of a place, this is especially effective for retrieving the image data of the place, even though one does not have a detailed knowledge of its location.

BRIEF DESCRIPTION OF THE DRAWINGS

The above and other objects and advantages of the present invention will become apparent for those skilled in the art from the following detailed description when read in conjunction with the accompanying drawings, in which:

FIG. 8 is a diagram showing an example of contents-related information attached to the image data according to a preferred embodiment of the present invention;

FIG. 9 is a diagram showing a hardware configuration of the image resource database according to a preferred embodiment of the present invention;

FIG. 14 is a diagram showing a hierarchical configuration of retrieval items according to a preferred embodiment of the present invention;

FIG. 16 is a diagram showing an example of the retrieval receiving screen (a third example) according to a preferred embodiment of the present invention;

FIG. 17 is a diagram showing an example of a retrieval result display screen (a first example) according to a preferred embodiment of the present invention;

FIG. 18 is a diagram showing an example of the retrieval result display screen (a second example) according to a preferred embodiment of the present invention;

DETAILED DESCRIPTION OF THE PREFERRED EMBODIMENTS

Preferred embodiments of the present invention will be described below with reference to the drawings.

(1) On-Demand Image Delivery System
(1-1) Overall Configuration

Figure 1:
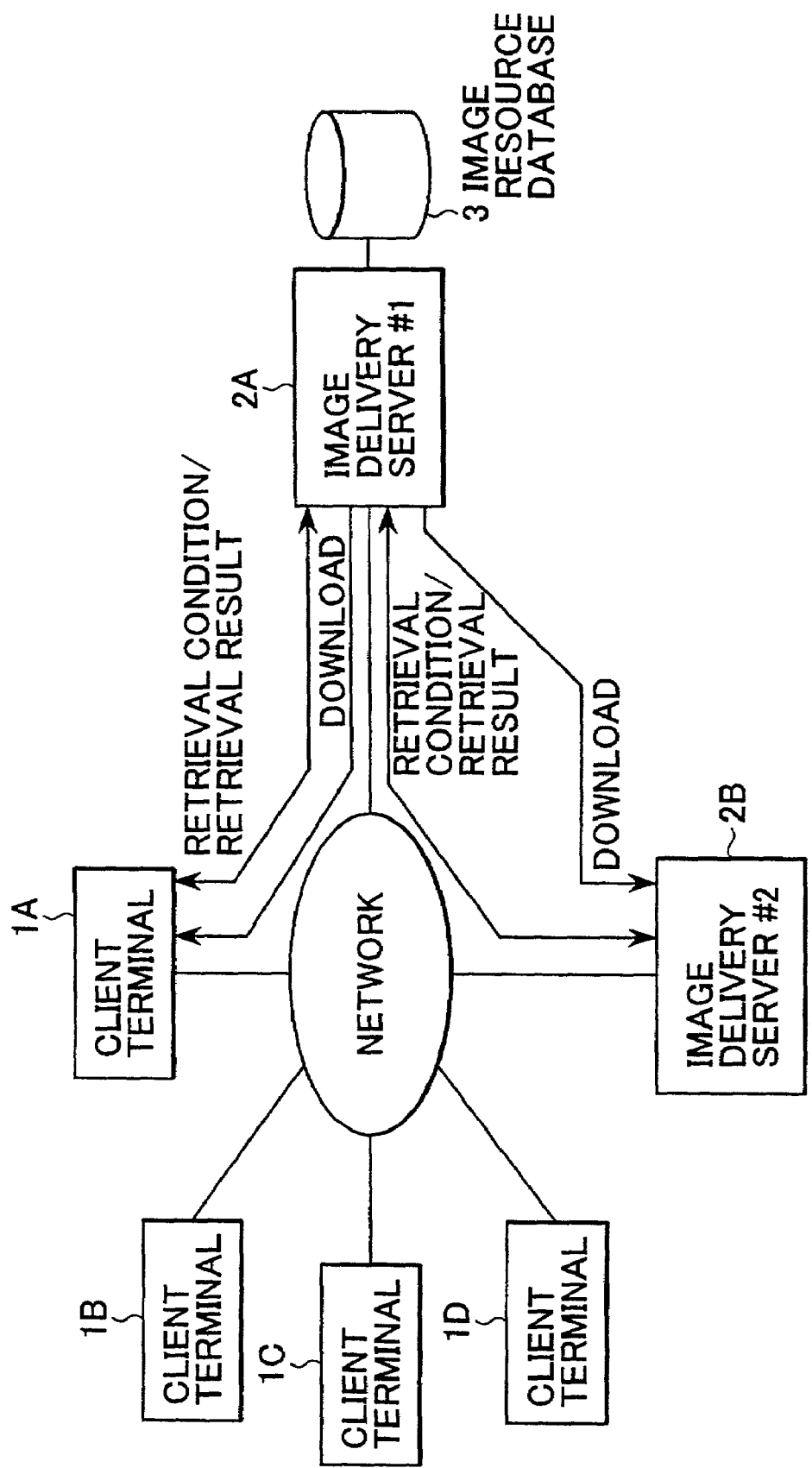
FIG. 1 is a block diagram of a configuration example of an on-demand image delivery system according to a preferred embodiment of the present invention.

FIG. 1 illustrates an example of configuration of an on-demand image delivery system according to the present invention. The on-demand image delivery system is constituted by a client terminal 1 requesting a desired image, an image delivery server 2 delivering desired image data based on the request, and an image resource database 3 saving an image resource. FIG. 1 is a schematic illustration of the on-demand image delivery system, and its configuration is not limited to this example.

As shown in FIG. 1, the client terminal 1 (1A, 1B, . . . ) and the image delivery server 2 (2A, 2B, . . . ) constituting the on-demand image delivery system are connected via network. For networks, in this case, a public telecommunication network, the Internet, a private telecommunications network, an ATM (Asynchronous Transfer Mode) network, and other communications networks can be used. These networks are not limited to the wire telecommunications networks (optical communications networks included), and wireless communications networks (regardless of the communication mode) are equally acceptable.

Further, it is not necessary for any of the client terminal 1, the image delivery server 2, and the image resource database 3 making up the on-demand image delivery system to be available in the same country or the same administrative region. These can be arranged to be located in different countries and different administrative regions.

(1-2) Server System

Figure 3:
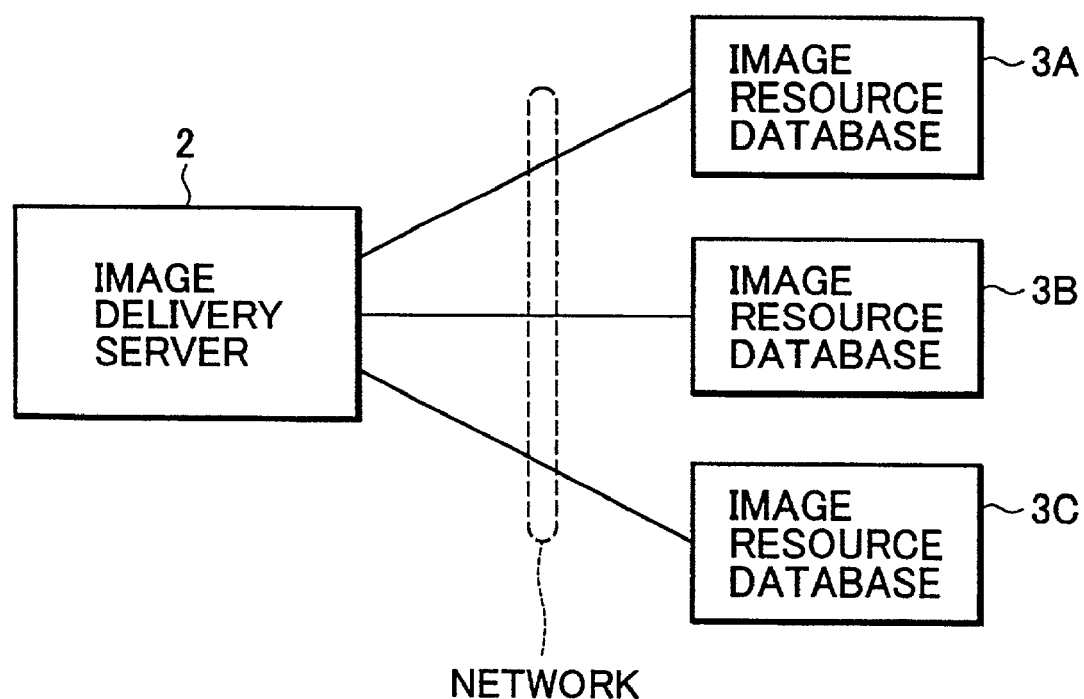
FIG. 3 is a diagram showing a position relationship between an image delivery server and a first example of image resource database according to a preferred embodiment of the present invention.
Figure 4:
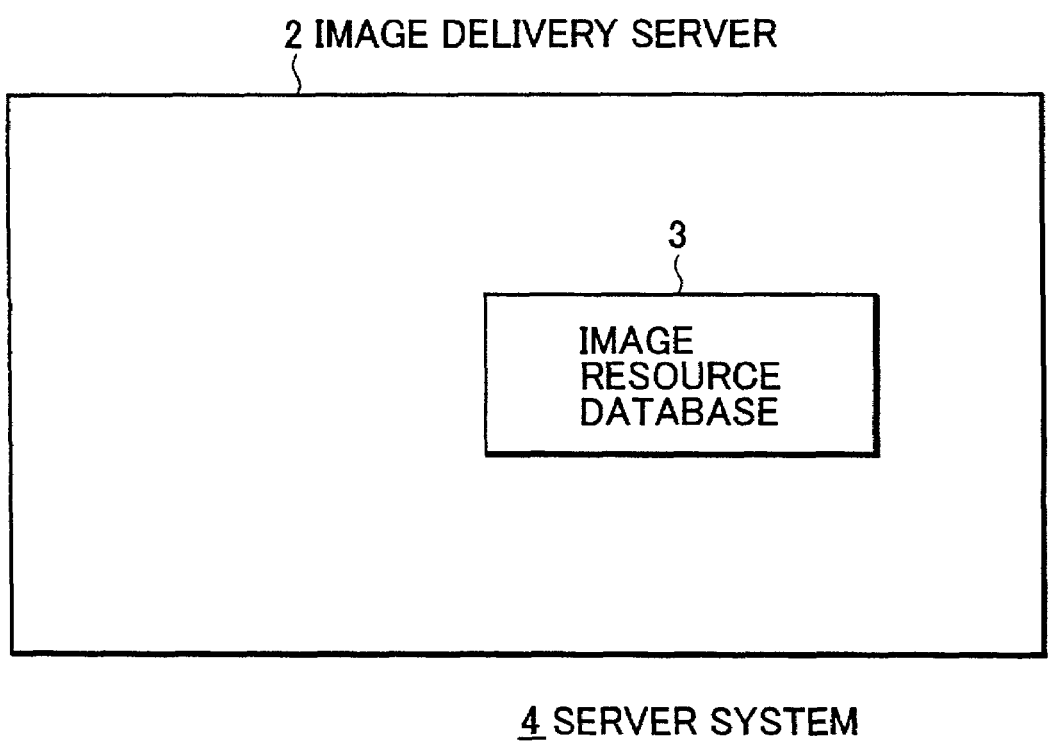
FIG. 4 is a diagram showing a position relationship between the image delivery server and a second example of image resource database according to a preferred embodiment of the present invention.

As shown in FIG. 3, a server system 4 includes an image delivery server 2 executing retrieval processing of image data (retrieval condition receiving, retrieval execution, and retrieval result display) and an image resource database 3 storing image assets. However, it is not necessary for the image delivery server 2 and the image resource database 3 to be in the same building or in the same apparatus. For example, as shown in FIG. 3, a configuration of the image deliver server 2 and the image resource database 3A to 3C (FIG. 3 shows a case of three image resource databases, but there is a case of one or a case of a plurality of any) connected via network is adequate. Also, as shown in FIG. 4, a configuration in which the image delivery server 2 and the image resource database 3 (although FIG. 4 shows only one image delivery database, there is a case of a plurality of any as well) are installed in a same building or in a same apparatus is also acceptable.

In general, it is assumed that the operation of the server system 4 is managed by a broadcasting station, image production company, and any other business operator, whereas, a case where the business operator of the image delivery server 2 and the business operator of the image resource database 3 are separate and distinct is very much possible. For instance, there can be an embodiment in which a third party offers a service of delivering the image resources of broadcasting stations and image production companies. As a connection mode for the embodiment, the connection mode shown in FIG. 3 as depicted above is employed.

(1-3) Client Terminal

Figure 5:
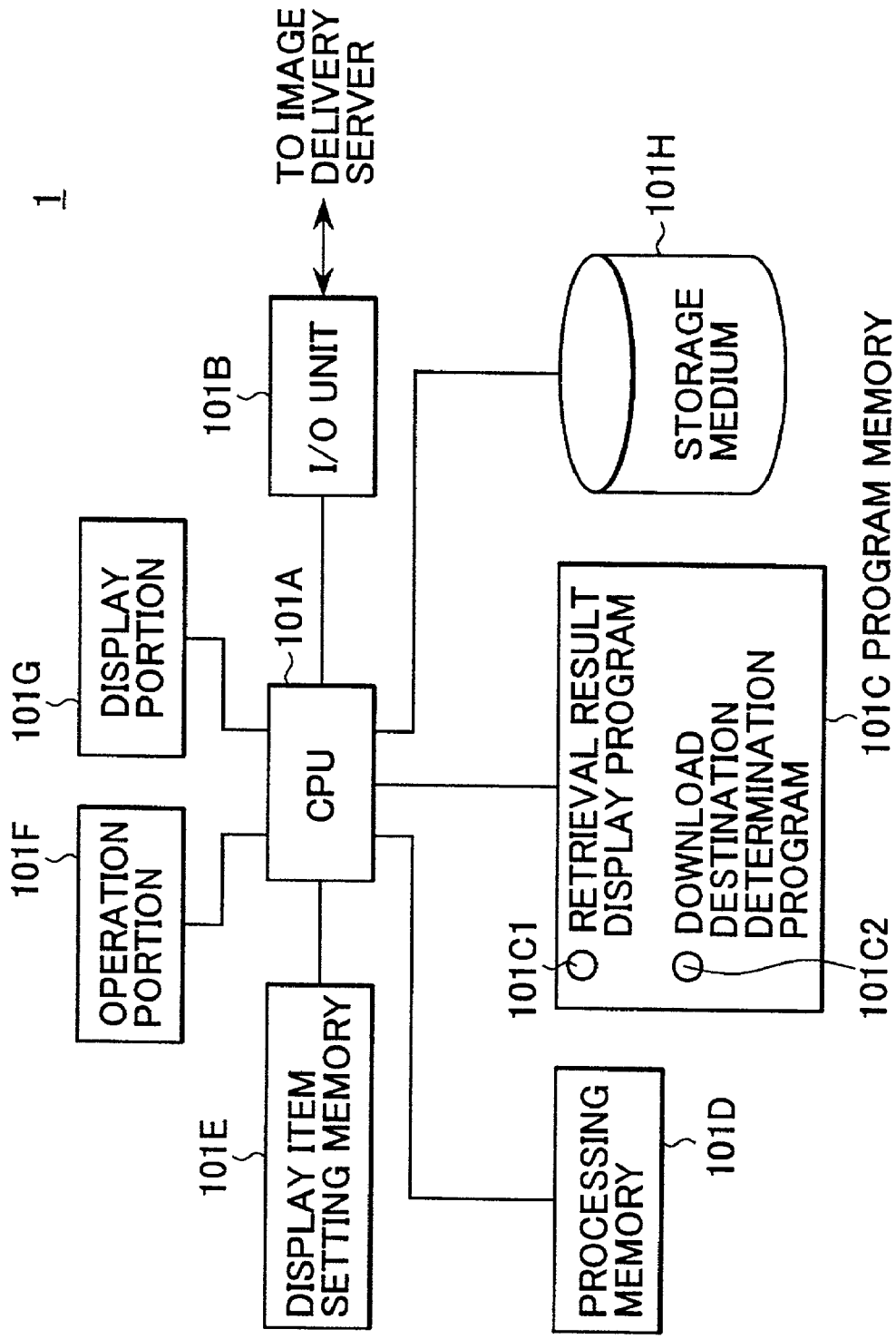
FIG. 5 is a diagram showing a hardware configuration of the client terminal according to a preferred embodiment of the present invention.

FIG. 5 illustrates a hardware configuration of the client terminal 1. By the way, a computer terminal, a PDA (personal digital assistant), a portable telephone, a set-top box, a television receiver or other home electric appliances can be considered for the client terminal 1.

As shown in FIG. 5, the client terminal 1 comprises a CPU 101A to realize various functions, an I/O portion 101B used for communications with the aforementioned image delivery server 2, a program memory 101C, a processing memory 101D, a display item setting memory 101E, an operation portion 101F, a display unit 101G necessary for retrieval operation, a storage medium 101H(magnetic storage medium such as a hard disk, optical or magneto-optic disk such as a read/write storage disk, semiconductor storage medium such as a memory card) for saving received data (including downloaded image information).

Further, when a map information database is included, although not illustrated, the client terminal can map simplified image data on the map and display it on the screen by using position information such as GPS (Global Positioning System) information included in the retrieval result which is provided by the aforementioned image delivery server 2.

It should be noted that these components need not to be installed in a single frame. For example, the components can be installed in a separate frame as in the case of a relationship between a television receiver for the display unit and a set-top box realizing other functions.

In general, the client terminal 1 functions as the principal unit of executing processing to specify the image data to be delivered (i.e., input processing of the retrieval condition and specified processing of the image data to be downloaded) and also functions as the download destination of the specified image data, the client terminal 1A and the image delivery server 2A of FIG. 1 indicating this relationship.

Figure 2:
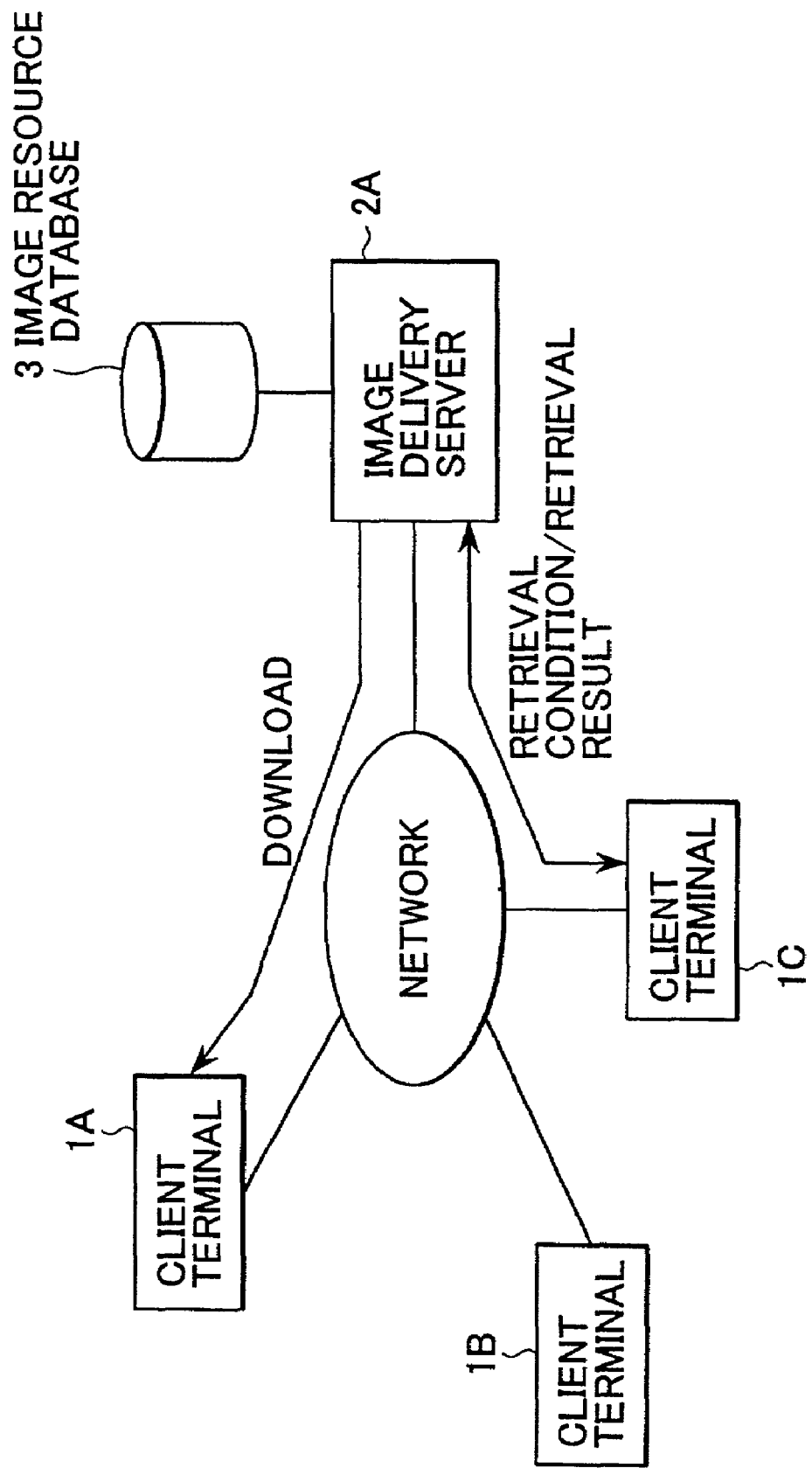
FIG. 2 is a diagram of an example when a client terminal executing specified processing of delivered images and a client terminal serving as the delivery destination are different.

However, the client terminal which executes the processing to specify the image data to be delivered can be different from the client terminal that is to become the download destination of the image data specified. FIG. 2 illustrates an example in which the client terminal 1C is the terminal specifying the image data to be delivered, while the client terminal 1A is the terminal to become the download destination of the specified image data.

Incidentally, this function is realized after the client terminal 1C communicates to the client terminal 1A prior to the download execution and sets the client terminal 1A in the downloadable status, while the image delivery server 2A designates the client terminal 1A as the download destination of the specified image data.

Such functions are introduced by the download destination determination program 101C2 of a program memory 101C in FIG. 5.

Such function is effective, for example, at a stopover while going outside when it is desired to download the specified image data to a computer device at home, set-top box or the like having a reserve in the storage capacity by using a client terminal with a limit on the storage capacity such as portable telephone. Naturally, small storage capacity is not a requirement of the client terminal used for specifying the image data for delivery, and utilization of such function is possible even in case there is a sufficient remaining capacity. Namely, the user of the client terminal can use the terminal freely.

Further, the client terminal per se is in accordance with the foregoing explanation. It should be noted, however, that, as shown in FIG. 1, when there is a plurality of image delivery servers and when one of the image delivery servers downloads desired image data from a different image delivery server, the image delivery server (2B in FIG. 1) requesting the desired image data (transmitting the retrieval condition and, specifying the image data to download from the responded retrieval result) functions as the client terminal when viewed from the image delivery server (2A in FIG. 1) delivering the image data.

A display item setting function portion, not illustrated, is installed in the client terminal 1 to store display items (items permitting display) when a view of the retrieval result presented by the image delivery server 2 is displayed. This function is realized when a retrieval result display program 101C1 of FIG. 5 reads out the setting items stored in the display item setting memory 101E.

The setting of this item can be carried out by the client terminal 1 user, by the image delivery server 2 side or by the image resource database 3 side. When the client terminal 1 user carries out setting, it can be limited to those items easy for the user utilizing the retrieval result to use. Furthermore, the setting in this case can be so arranged that automatic setting can be performed from the user's past designated history or setting history. When the image delivery server 2 side carries out setting, it can be so arranged that the items not desired by the image delivery server 2 business operator are not displayed on the screen of the client terminal 1. Likewise, when the image resource database side 3 carries out setting, it can be so arranged that the items not desired by the image resource database side 3 business operator (e.g., management data and confidential data) are not displayed on the screen of the client terminal 1.

Indeed, the system so designed that the items to be saved by the display item setting memory 101E of FIG. 5 include only those items set at the client server terminal 1 and that a write operation cannot be performed from the image delivery server 2 and the image resource database 3, is also acceptable. In this case, too, the display items to be displayed on the screen can be so arranged as to be determined finally by performing the AND operation between the display items independently set by the image delivery server 2 and the image resource database 3 respectively (there are cases where the display permitted items or the display prohibited items are attached to the retrieval result and transmitted and, also, cases where only the retrieval result comprising the retrieval items, display of which is to be permitted beforehand, are transmitted) and the display permitted items set by the client terminal 1.

The arrangement can also be made to let the client terminal 1 to notify the service provider side (the image delivery server 2 and the image resource database 3, which offers the image delivery service, of the items, display of which is not desired by itself, or the items, display of which is desired. In this case, the retrieval result display program 101C1 of FIG. 5 reports the information saved in the display item setting memory 101E.

(1-4) Image Delivery Server

Figure 6:
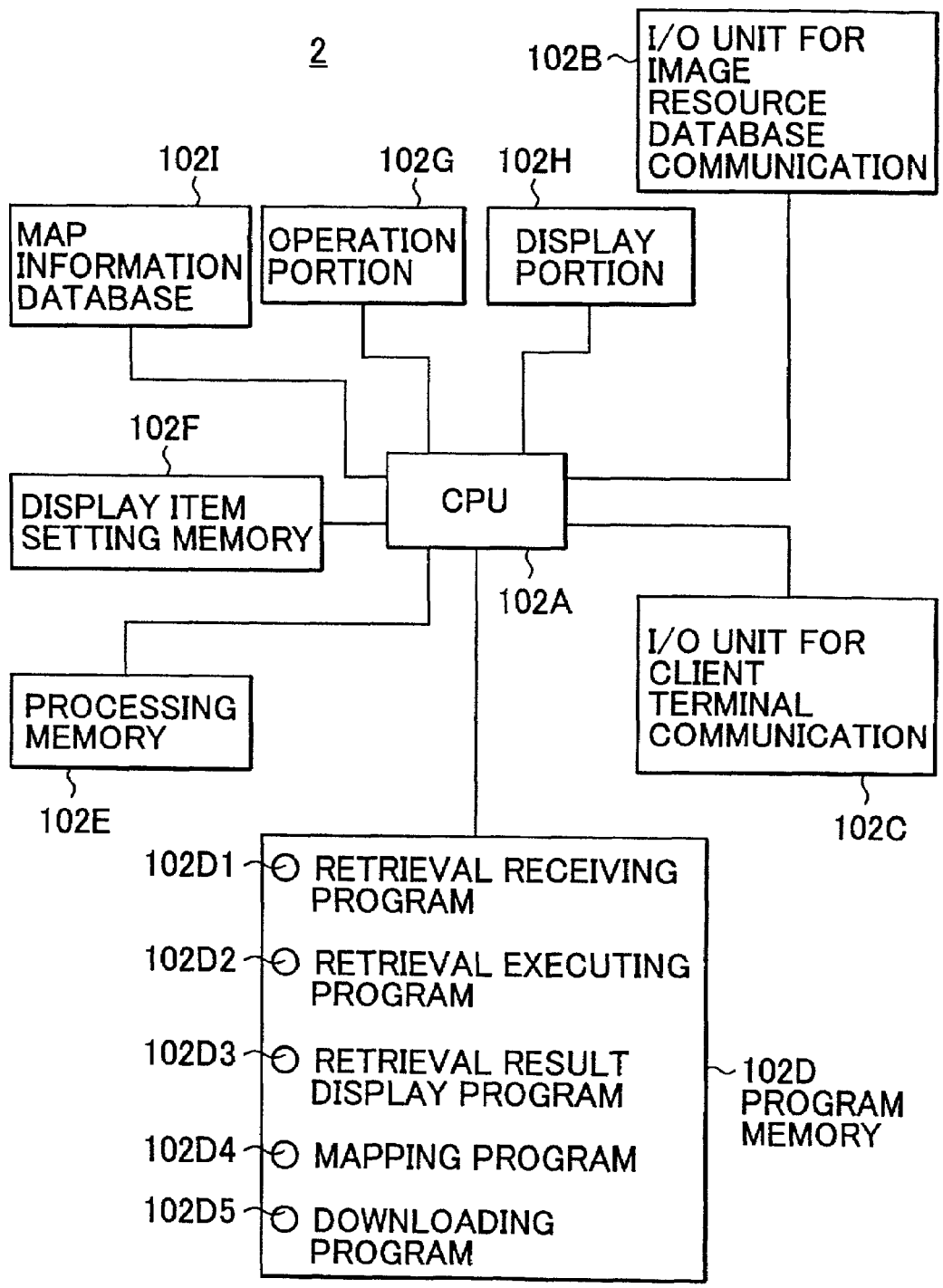
FIG. 6 is a diagram showing a hardware configuration of the image delivery server according to a preferred embodiment of the present invention.
Figure 7:
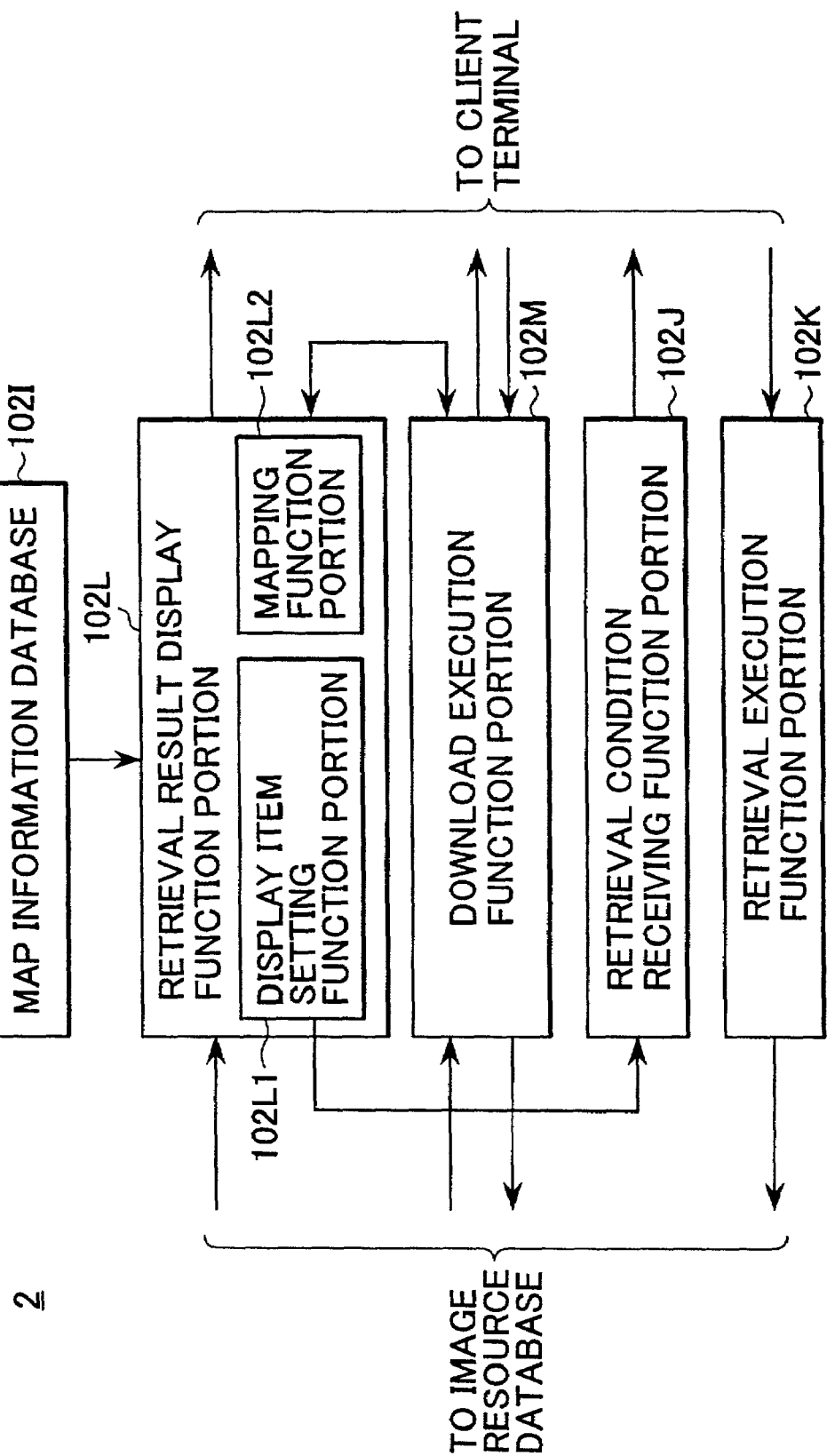
FIG. 7 is a diagram showing a software configuration of the image delivery server according to a preferred embodiment of the present invention.

FIG. 6 and FIG. 7 show each example of a hardware configuration and software configuration of the image delivery server 2. These drawings, respectively, express functionally and do not bind any actual circuit structure itself.

First, the hardware configuration shown in FIG. 6 will be described. The image delivery server 2 comprises a CPU 102A as the operation portion, an I/O portion 102B used for communications to the image resource database, an I/O portion 102C used for communications with the client terminal, a program memory 102D, a processing memory 102E, a display item setting memory 102F, an operation portion 102G, a display portion 102H, and a map information database 102I.

The I/O portions 102B and 102C in this case are mounted with communications function in compliance with the communications method used for communicating to the image resource database 3 in FIG. 1 or the like illustrated above.

Also, the program memory 102D is used for storing the retrieval receiving program 102D1, the retrieval execution program 102D2, retrieval result display program 102D3, the mapping program 102D4, the downloading program 102D5, and other programs (e.g., a program for mutually converting GPS information and place names. Further, when said conversion program is used, even though the retrieval condition is place names, retrieval can be made by GPS information. Also, the place names which are converted from the retrieval result obtained by retrieving with GPS information in a manner for the user to easily understand, can be displayed). Among these, the mapping program 102D4 is the program which provides a mapping display of image data on the map when GPS information (longitude, latitude, altitude, and the date and time) is included in the contents-related information attached thereto matching the retrieval condition.

When a function of displaying only the designated items is set up in case of displaying the retrieval result on the screen of the client terminal in a view form, the display item setting memory 102F is used for storing the items that can be displayed or the items to be excluded.

The operation portion 102G and the display portion 102H are used for maintenance and for setting the aforementioned display items.

The map information database 102I is the database in which to store map information subject to mapping when the retrieval result is displayed on the screen of the client terminal 1 in mapping form, and the map information database 102I can be either provided in the image delivery server 2 or connected to the outside.

Next, the software configuration shown in FIG. 7 will be described. The image delivery server 2 comprises a retrieval condition receiving function portion 102J, a retrieval execution function portion 102K, a retrieval result display function portion 102L, and a download execution function portion 102M.

The retrieval receiving function portion 102J in this case is a function portion displaying a screen for receiving the retrieval condition on the screen of the aforementioned client terminal 1 and assisting the user's inputting. A specific example of the display screen will be described later. Now, the retrieval condition receiving function portion 102J also has a function of linking the items displayed on the screen for receiving the retrieval condition based on information held in the display item setting function portion 102L1. Naturally, it is acceptable even if linking is not provided.

The retrieval execution function portion 102K is a means through which, when the retrieval condition is inputted from the client terminal 1 side, the retrieval condition is given to the image resource database 3.

The retrieval result display function portion 102L is a means through which, when simplified image data of the image data matches the retrieval condition, contents-related information attached to the image data matching the retrieval condition or their combinations are received from the image resource database 3, such data is edited into display data according to a table form or a mapping form and transmitted to the client terminal.

The simplified image data in this case means the image data that is prepared or generated for displaying the retrieval result with its information volume reduced from that of the original image data. Especially in the case of a portable telephone or the like wherein the client terminal is subject to constraint on the display capability (area that can be displayed, communications capability or the like), there is a meaning in providing such simplified image data. Of course, even in case of high display capability, such data is effective in raising the processing capability to increase the response speed. Also, in case of motion picture data, part of the images of the principal unit and static images of representative scenes are included as well.

The display item setting function portion 102L1 and the mapping function portion 102L2 are included in the retrieval result display function portion 102L.

The display item setting function portion 102L1 is means wherein, from among simplified image data attached to the image data and contents-related information (e.g., "Title," "Genre of Title" . . . "Artist, Staff" . . . "Position of Equipment (longitude, latitude or the like)", "Position of the Object (longitude, latitude or the like)" . . . ) matching the retrieval condition, those items that can be displayed in a view are stored. The contents of the display of the retrieval result are determined based on the information stored in the display item setting function portion 102L1.

In addition, the setting items to be stored in the display item setting function portion 102L1 can be so arranged as to be set by the business operator administering and operating the image delivery server 2, by the business operator administering and operating the aforementioned image resource database 3, or by the user of the aforementioned client terminal 1. Also, the setting items to be stored in the display item setting function portion 102L1 can be so adapted as to enable the retrieval result display function portion 102L to set automatically from the past designated histories or setting histories.

In this case, when the business operator administering and operating the image delivery server 2 carries out setting, even despite the presence of a plurality of business operators offering said retrieval service, it is possible to establish originality for each business operator. That is, differentiation of the user interfaces becomes possible.

In contrast, when the business operator administering and operating the image resource database carries out setting, information not desired by the business operator administering and operating the image resource database can be prevented from issuing out to the client side.

Also, when the client terminal user carries out setting, since only the information the user needs can be displayed on the screen, a user friendly system can be provided.

Further, as a method of automatically setting from the past designated histories or setting histories, there can be considered a method of using the histories of high frequency from among the histories over the previous months, histories regarding the specified objects and clients, and histories of the specified groups (including many and unspecified persons). A user friendly system can be provided even by employing the preceding setting method.

Moreover, the aforementioned display item setting function portion 102L1 provides a function of notifying the client terminal 1 and image resource database 3 mentioned above of the display items desired thereby or the display items not desired.

When the retrieval result is displayed in mapping form (in case of being requested by the client terminal side and also in case of executing according to the judgment of the retrieval result display function portion 102L), the mapping function portion 102L2 provides means for executing processing for mapping the simplified image data received from the image resource database 3 to a point determined by its GPS information (longitude, latitude, altitude, and time).

As regards the case where the retrieval result display function portion 102L automatically activates the mapping function portion 102L2, there can be considered a case in which, as the retrieval condition is vaguely determined, such as, for example, "government section," a plurality of image data may correspond to such vague retrieval condition. It has to be noted that, in a case like this, because of a possibility of numerous image data being registered at a same point, there can be devised a method, whereby the image resource database and the retrieval result display function portion 102L selectively map one of the representative simplified image data registered based on the retrieval histories, and a method whereby all or part of such representative data (e.g. the representative image of each genre) is subjected to mapping hierarchically, and only the image situated at the highest order hierarchy can be seen visually at all times from the client terminal side. Naturally, when mapping hierarchically in this way, it is so designed that an image at a low order hierarchy makes the round of moving up to a high order hierarchy, making it possible to confirm all images, as a consequence.

As a result of the function of this mapping function portion 102L2, the client terminal user can proceed with retrieving operation visually without relying on character data.

(1-5) Image Resource Database

FIG. 9 shows a hardware configuration example of the image resource database 3. FIG. 9 is a functional expression and is not binding to the extent of the actual circuit structure yet.

The image resource database 3 includes, as its principal components, a storage medium 103A storing image resources (including the simplified image data 103A2 in addition to the image data 103A1 proper) and its contents-related information 103A3, the I/O portion 103B for carrying out communications with the aforementioned image delivery server 2, the retrieval execution portion 103C which executes retrieval processing based on the retrieval condition provided through the I/O portion 103B and offers the simplified image data or the like of the image data matching the retrieval condition to the I/O portion 103B, the operation portion 103D used for administration and operation, and the display portion 103E.

In this case, as the contents-related information 103A3 stored in the storage medium 103A, in addition to what is shown in FIG. 8, "Cameraman," "Journalist," "Director," "Source Information," "Recording Method," "On-Air Date and Time," "Copyright Holder" or the like are included. Furthermore, for "Longitude," "Latitude," "Altitude," "Date and Time" or the like stored in said contents-related information, for example, numeric values measured through the GPS receiver are used, although these values are not limited to the values measured by the GPS receiver.

A display item setting function portion 103C1 is provided in the retrieval execution portion 103C. The function of the display item setting function portion 103C1 is the same as that of the display item setting function portion 102L1. Namely, among the simplified image data 103A2 attached to the image data and the contents-related information 103A3 matching the retrieval condition, the display item setting function portion 103C1 stores the items that can be displayed as a view.

Further, the setting items stored in the display item setting function portion 103C1 can be set by the image resource database 3 administrator (business operator) or can be adapted for the aforementioned image delivery server 2 administrator (business operator) to carry out setting. Also, the setting items stored in the display item setting function portion 103C1 can be so arranged that the retrieval execution portion 103C of the image resource database 3 can automatically carry out setting from the past designated histories or setting histories.

In this case, when the business operator administering and operating the image resource database 3 carries out setting, the information not desired by the image resource database administrator (business operator) can be excluded from issuing out to the aforementioned image deliver server 2 and the client terminal 1. Also, by making it possible for designations to be made from the image delivery server 2 side, the originality of the business operator administering and operating the image delivery server can be reflected in the display, and differentiation from other business operators can be realized.

Also, when the client terminal user carries out setting, since only the information needed by the user can be displayed on the screen, a user friendly system can be provided.

In addition, as a method of automatically setting from the past designated histories or setting histories, there can be considered a method of using the histories of high frequency from among the histories over the previous few months, histories regarding the specified objects and clients, and histories of the specified groups (including many and unspecified persons). A user friendly system can be provided even by employing the setting method in this manner.

Further, the aforementioned display item setting function portion 103C1 provides a function of notifying the aforementioned client terminal 1 and the image delivery server 2 of the display items desired thereby or the display items not desired to be displayed.

(2) Retrieval Program

The contents of the retrieval program held by the image deliver server 2 are be described below.

(2-1) Retrieval Receiving Program

Figure 10:
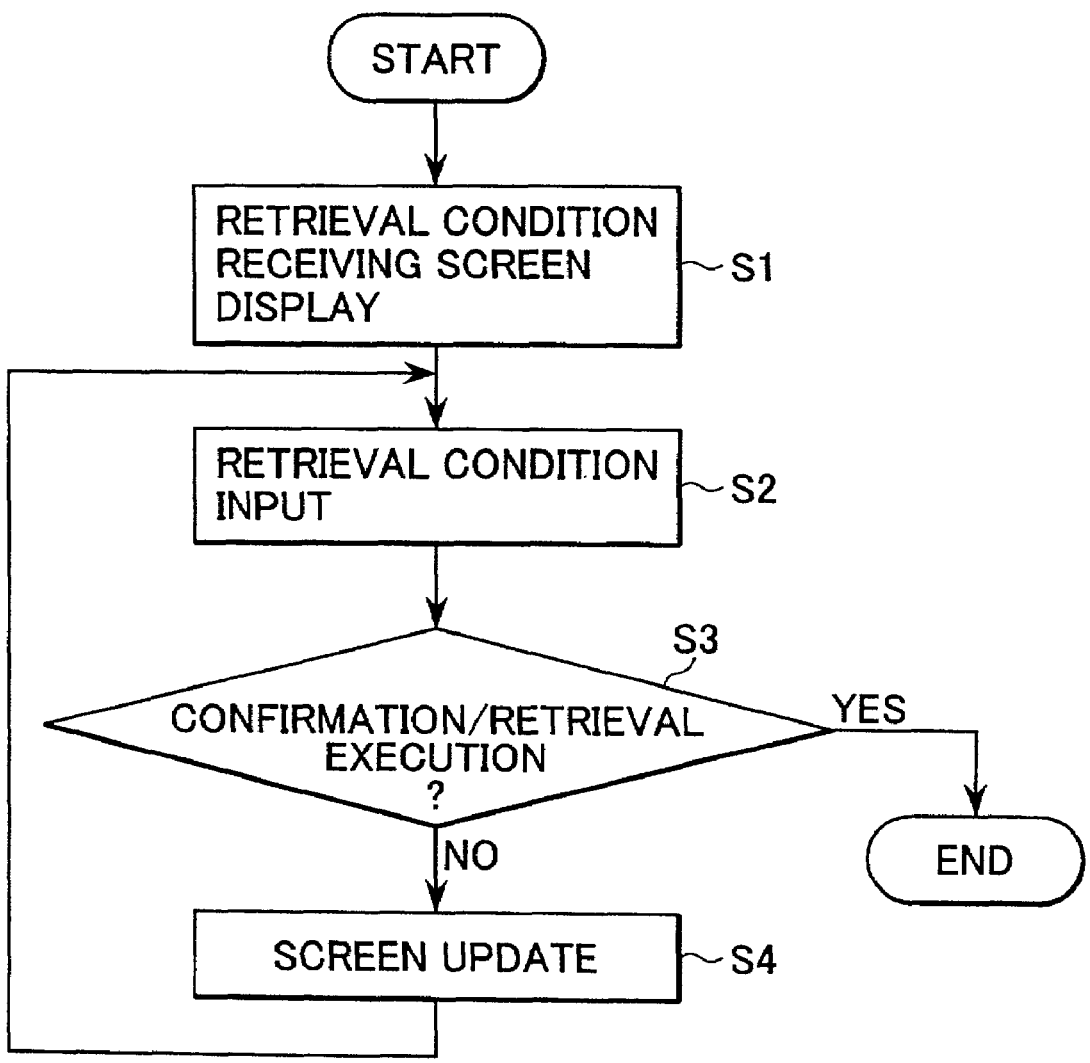
FIG. 10 is a diagram showing a general processing procedure of a retrieval receiving program according to a preferred embodiment of the present invention.

FIG. 10 shows an outline of the retrieval receiving program 102D1 stored in the program memory 102D of FIG. 6. The retrieval receiving program includes, as its principal processing steps, a step S1 for displaying the receiving screen to be explained later, a step S2 for receiving the input of the retrieval condition, a step S3 for judging whether the retrieval condition was confirmed and retrieval execution was instructed, and a step S4 for updating the receiving screen if the negative result is obtained in the step S3.

After execution of the step S4, the processing moves to the step S2 and stands by until a new retrieval condition is inputted from the client terminal 1. Also, when confirmation of the retrieval condition is made and the execution of retrieval is instructed at the step S3, upon receipt of the positive result, said retrieval receiving program ends, where after the retrieval execution program is activated.

(2-2) Retrieval Execution Program

The retrieval execution program provides means for accessing the storage medium of the image resource database 3 from which to retrieve the image data matching the retrieval condition and to extract the relevant image data or simplified image data or both and the contents-related information attached to the image data, although, in case of leaving the retrieving operation itself to the image resource database side, after the end of the retrieval receiving program, an operation of transmitting the confirmed retrieval condition to the image resource database side is executed.

(2-3) Retrieval Result Display Program

Figure 11:
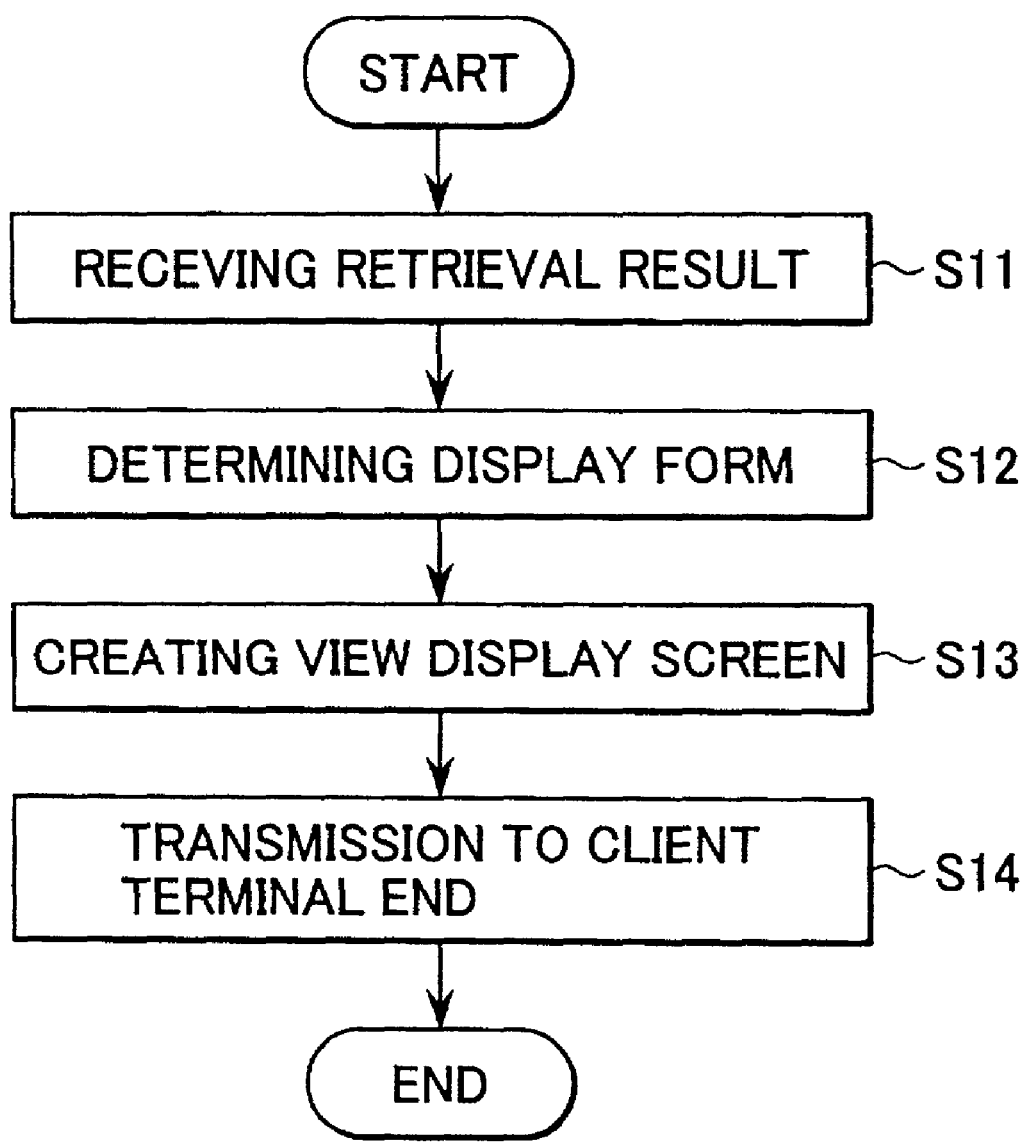
FIG. 11 is a diagram showing a general processing procedure of the retrieval result display program according to a preferred embodiment of the present invention.

FIG. 11 shows an outline of the aforementioned retrieval result display program 102D3. The retrieval result display program is composed of, as its principal processing steps, a step S11 of receiving the retrieval result from the image resource database 3, a step S12 of determining the display form of the retrieval result, a step S13 creating a display of a table form or a mapping form suited for a designated display form, and a step S14 for displaying the created data to the client terminal 1 and displaying the data on the screen.

In this case, when mapping form is determined in the step S12, the aforementioned mapping program 102D4 is activated and used for processing the step S13. The mapping program 102D4 provides a processing function of mapping the image data, by using GPS information, onto the map registered in the map information database 102I of FIG. 6 and FIG. 7.

Further, when the client, upon viewing the mapping screen, inputs an additional retrieval condition, the retrieval program previously mentioned is executed repeatedly.

(2-4) Downloading Program

Figure 12:
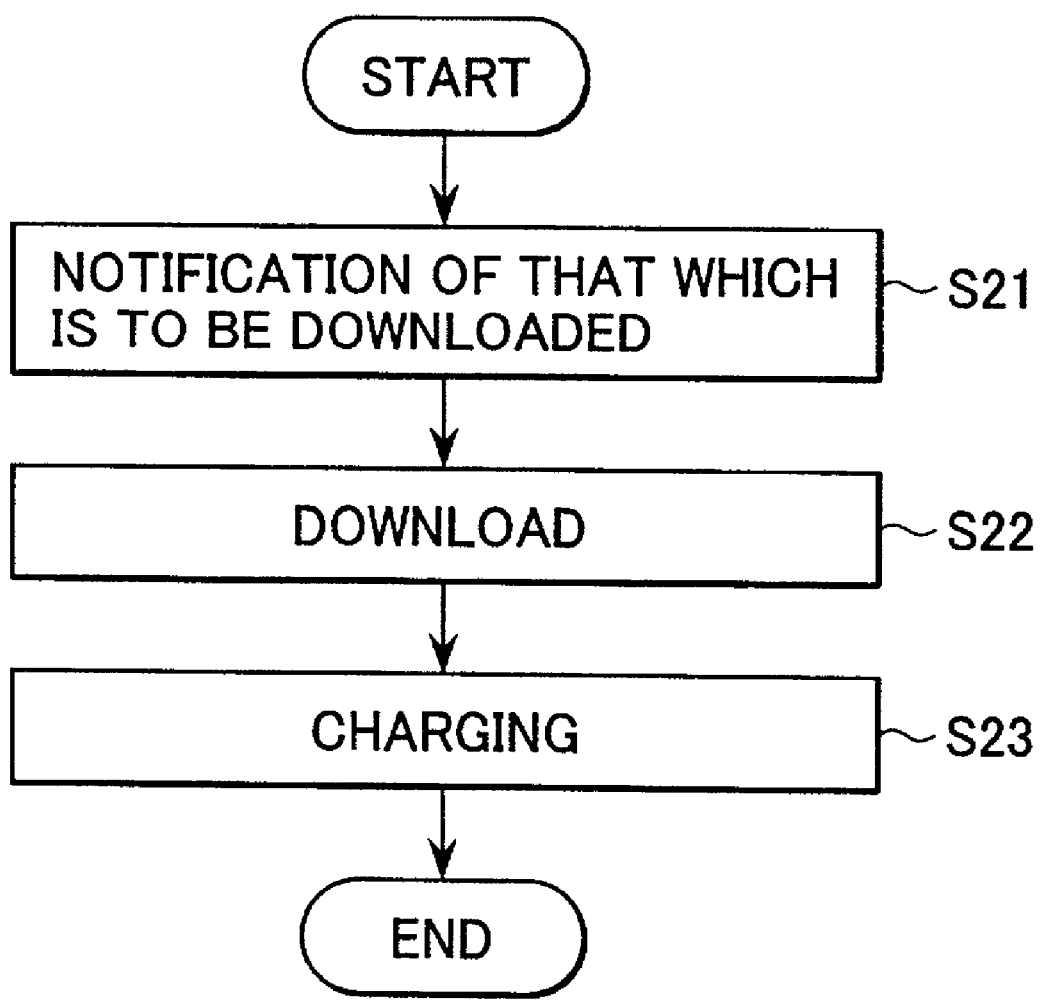
FIG. 12 is a diagram showing a general processing procedure of the downloading program according to a preferred embodiment of the present invention.

Moreover, the image data to be finally downloaded (not one but there can be a plurality of cases) is confirmed on the retrieval result display screen and the execution of downloading is instructed by the client terminal 1 user, then the aforementioned downloading program 102D5 is activated. FIG. 12 shows an outline of the downloading program 102D5. The downloading program 102D5 is made up of, as its principal processing steps, a step S21 of providing the image resource database 3 with information about the image data notified by the client terminal 1, a step S22 of executing download between the client terminal 1 and the image resource database 3, and a step S23 of executing charging processing with respect to the download.

Furthermore, in charging processing, the user ID and other authentication information (e.g., mail address and password), initial registration of which was made beforehand by the client terminal 1 user utilizing the delivery service, are used. It is assumed that the payment method (payment on credit, payment by transfer or the like) is registered at the time of initial registration.

In step S23, a consideration for the download is calculated according to the fee system including the fee for communications time, the fee based on the data volume, and other fees. The amount of the calculated consideration is stored in the memory portion not illustrated. In the event that the business operators of the image delivery server 2 and the image resource database 3 are different, the amount to be distributed to the business operator of the image resource database 3 is calculated.

(3) Retrieval Screen Examples (Display Method)

(3-1) Examples of Retrieval Receiving Screen

Display examples of the retrieval receiving screen are shown in FIG. 13 through FIG. 16. As mentioned above, the display screen is displayed on the display screen of the client terminal 1, and the display screen examples below can be so designed that they can be freely chosen by the client terminal 1 user or directly given by the image delivery server 2 side.

First Example

Figure 13:
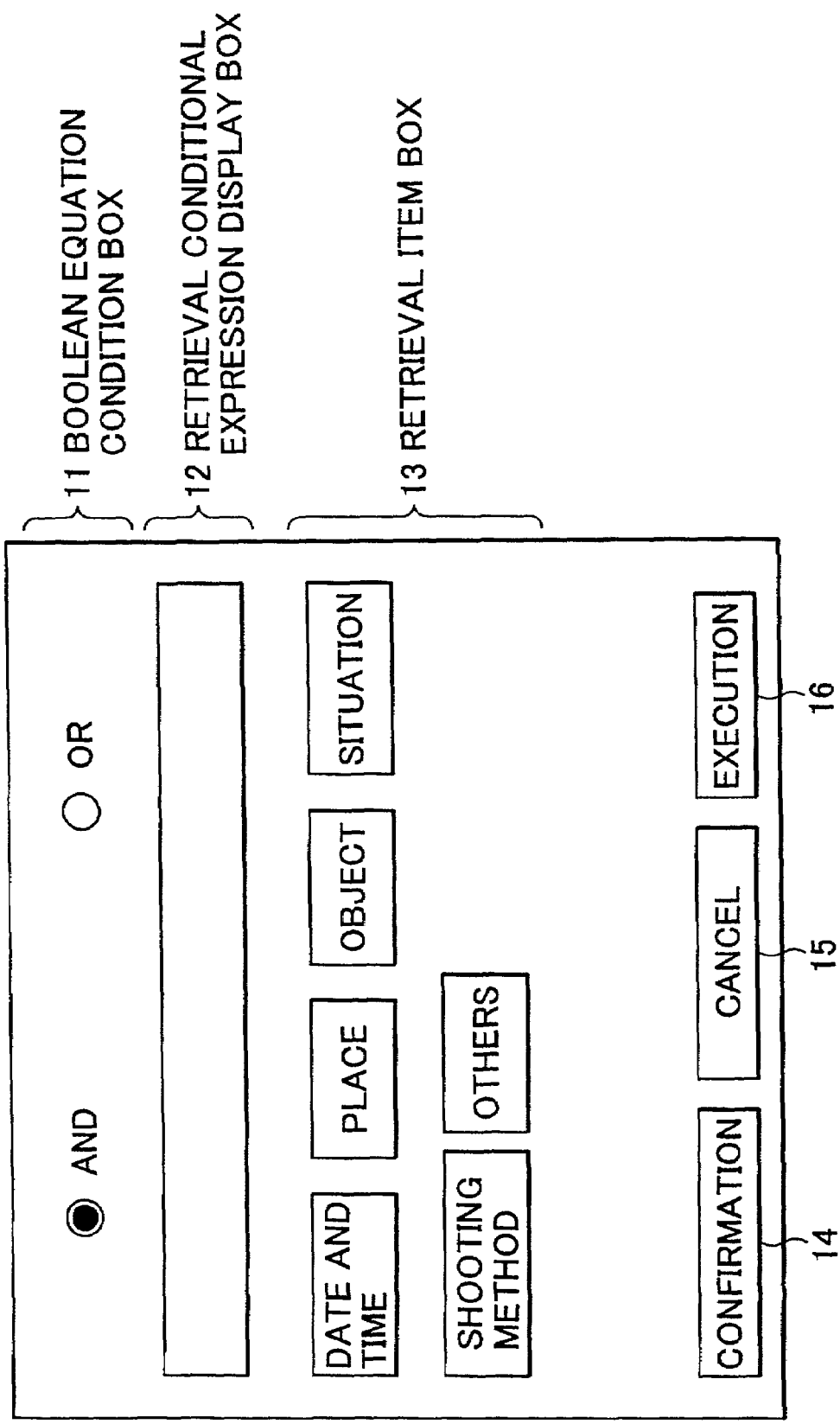
FIG. 13 is a diagram showing an example of a retrieval receiving screen (a first example) according to a preferred embodiment of the present invention.

FIG. 13 shows a first example of the display screen. This display screen example is an example of a case regarding the method of inputting selected items from those items displayed in the retrieval item box 13 as the retrieval condition. Further, in each item of the retrieval item box 13, as shown in FIG. 14, items that can be selected are available hierarchically. Consequently, the client terminal user can create the retrieval expression only by selecting the selected items. This function is advantageous to the user not having sufficient knowledge of the retrieval items in that appropriate retrieval items can be easily inputted.

Further, the confirmed items are shown in the retrieval conditional expression display box 12. When inputting a plurality of retrieval items, either "AND" or "Boolean ADD" shown in the Boolean equation condition box 11 is selected, although the Boolean equation condition can be revised by inputting manually, making it possible to create more complicated condition equations.

It has to be noted that the contents of the retrieval items shown in the retrieval item box 13 of FIG. 13 are generally linked to what is set in the display item setting function portion of the client terminal 1 and the image delivery server 2.

Now, when inputting a selected retrieval item, the CONFIRM button 14 is activated; when desiring to cancel a retrieval item which was inputted immediately before or a retrieval item which was selected on the screen, the CANCEL button 15 is pressed or activated; and when confirming the retrieval conditional expression and executing retrieval, the EXECUTE button 16 is activated. The same applies to other display screen examples.

Second Example

Figure 15A:
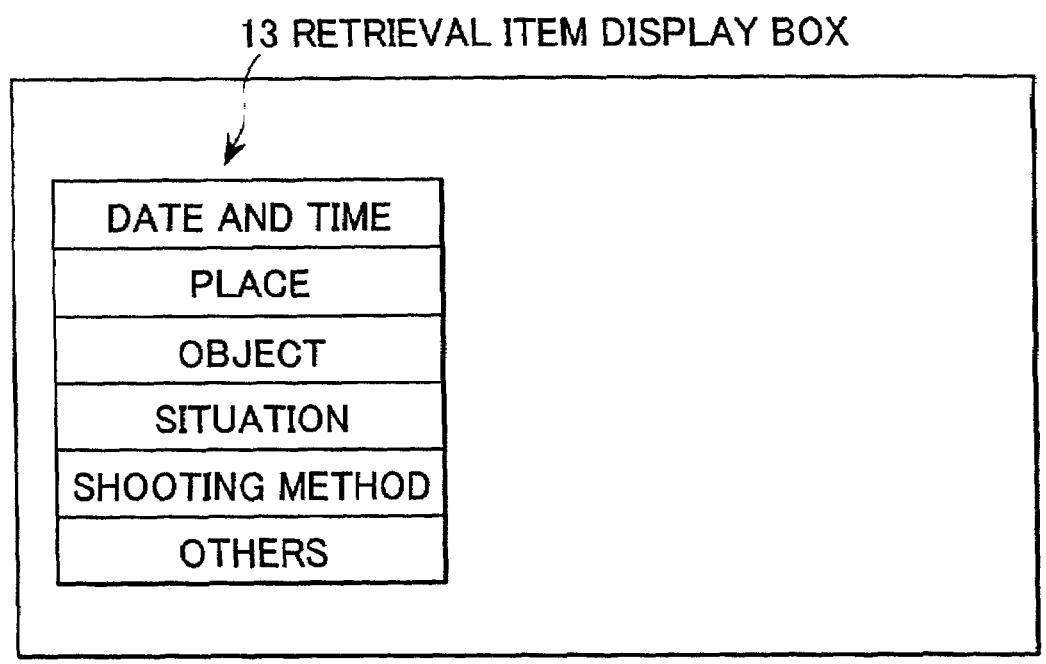
FIGS. 15A and 15B are diagrams showing an example of the retrieval receiving screen (a second example) according to a preferred embodiment of the present invention.
Figure 15B:
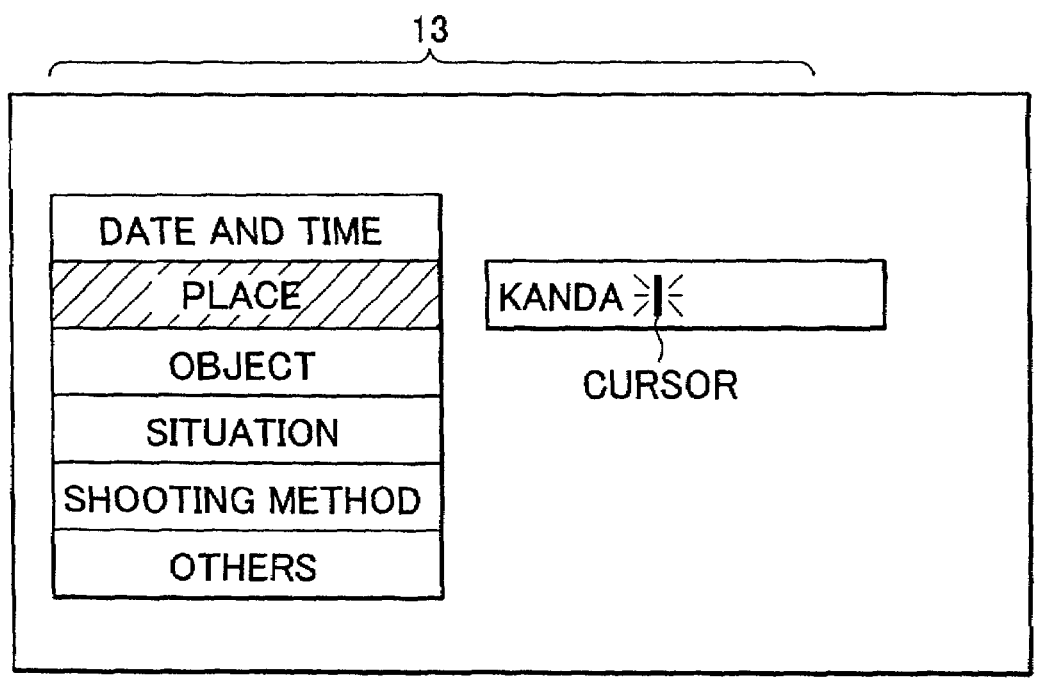

FIG. 15 shows a second example of the display screen. This display screen example is an example of a case regarding the method of inputting directly information one desires to retrieve after selecting an item to input from those items displayed in the retrieval item box 13. In FIG. 15 there is shown a situation when the client terminal 1 user inputs a term called "Kanda" after designating the retrieval item, "Place." In addition, only one retrieval condition is inputted in FIG. 15, but a plurality of inputs are naturally possible. By the way, to make effective use of the GPS information attached to the image data, when the "Place Name" is inputted, this is to be converted to GPS information.

Although not illustrated in FIG. 15, the Boolean equation condition box can be set up as well. If the box is set up, it is possible to select how a plurality of retrieval items should be used.

Third Example

FIG. 16 shows a third example of the display screen. This display screen example is, unlike the first example and the second example, an example of a case where the items displayed in the retrieval item box 13 are made up of images (including icons). Adoption of the input method makes it possible to make visual judgment and the people of all age brackets can easily execute retrieval processing.

(3-2) Examples of Retrieval Result Display Screen

In FIG. 17 through FIG. 20, display screen examples of the retrieval result are presented. As mentioned previously, the display screen is displayed on the display screen of the client terminal 1. The display screen examples below can also be so arranged that they can be freely selected by the client terminal 1 user or given directly from the image delivery server 2 side. It should be noted that the download destination can be set as necessary.

First Example

FIG. 17 shows a first example of display screen. This display screen example is an example of a case where the retrieval result is displayed in a table form, and the display items include only contents-related information (i.e., text information only). Generally, in this retrieval item box 21, the same retrieval items as those displayed in the retrieval item box 13 of the retrieval receiving screen are displayed in a same row. In the contents-related information box 22, registered information regarding the items other than the retrieval items designated as the retrieval condition is displayed in a view. The client terminal 1 user, by referring to these other contents-related information, presumes the contents of images and selects what is close to the image data is desired.

Moreover, when desired image data is confirmed, the CONFIRM button 23 is activated; when desiring to cancel downloading image data which was confirmed immediately before, the CANCEL button 24 is activated; and when desiring to execute one or a plurality of image data determined, the EXECUTE button 25 is activated. The same procedures applies to other display screen examples.

Second Example

FIG. 18 shows a second example of the display screen. While this display screen example is the same as the first example in that the retrieval result is displayed according to table form, it is different in that the simplified image data is added to the information of the first example. When the simplified image data is added in this manner, the client terminal 1 user gains an advantage of being able to confirm the outline of the image data in advance, thus avoiding useless downloading.

Third Example

Figure 19:
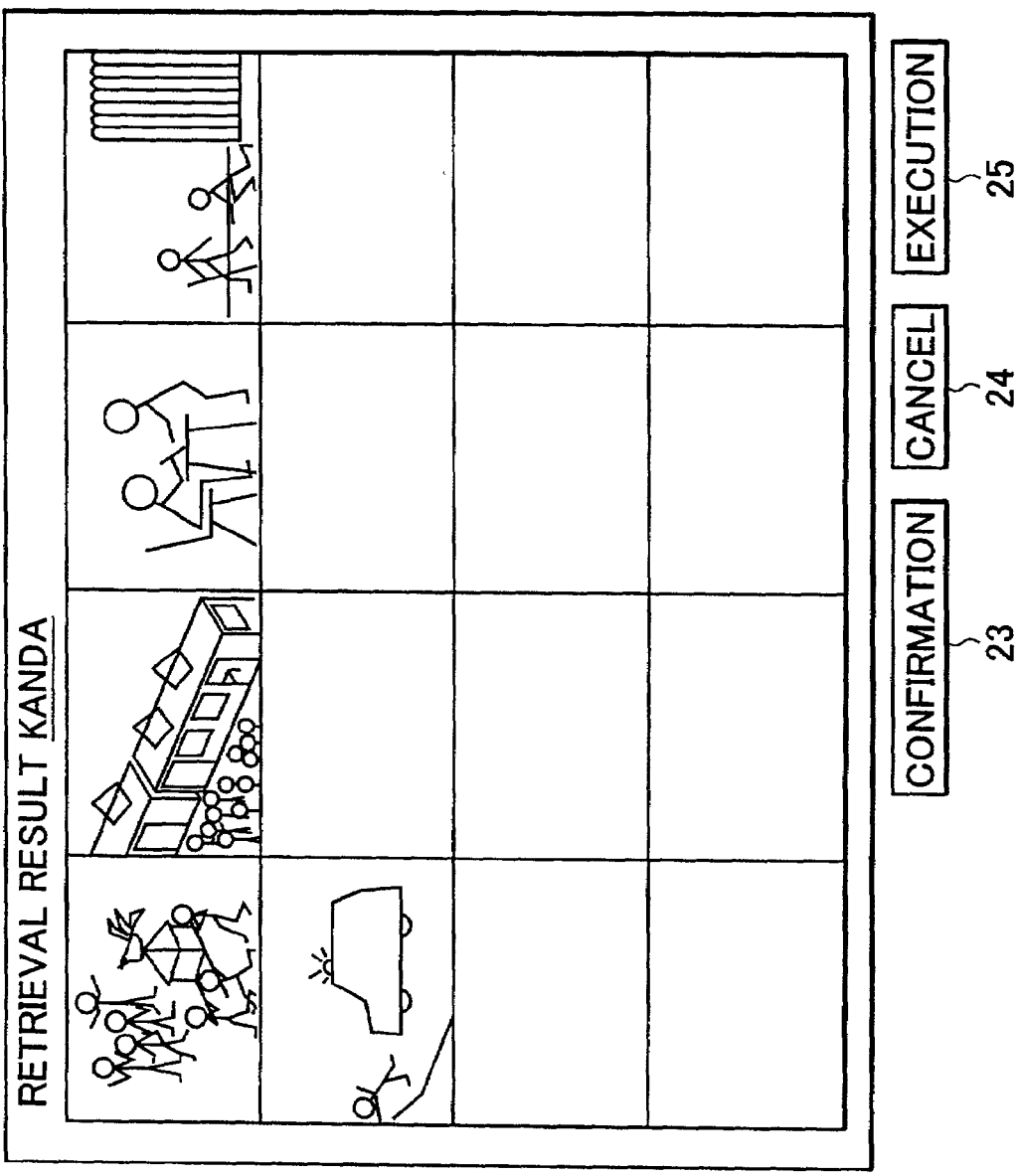
FIG. 19 is a diagram showing an example of the retrieval result display screen (a third example according to a preferred embodiment of the present invention)

FIG. 19 shows a third example of the display screen. This display screen example is, too, an example of the case where the retrieval result is displayed according to table form, whereas this display screen example is different in that the display items include only simplified image data. By preparing such display method, the client terminal 1 user obtains a benefit of being able to confirm the outline of the image data in advance, thereby avoiding useless downloading.

Fourth Example

Figure 20:
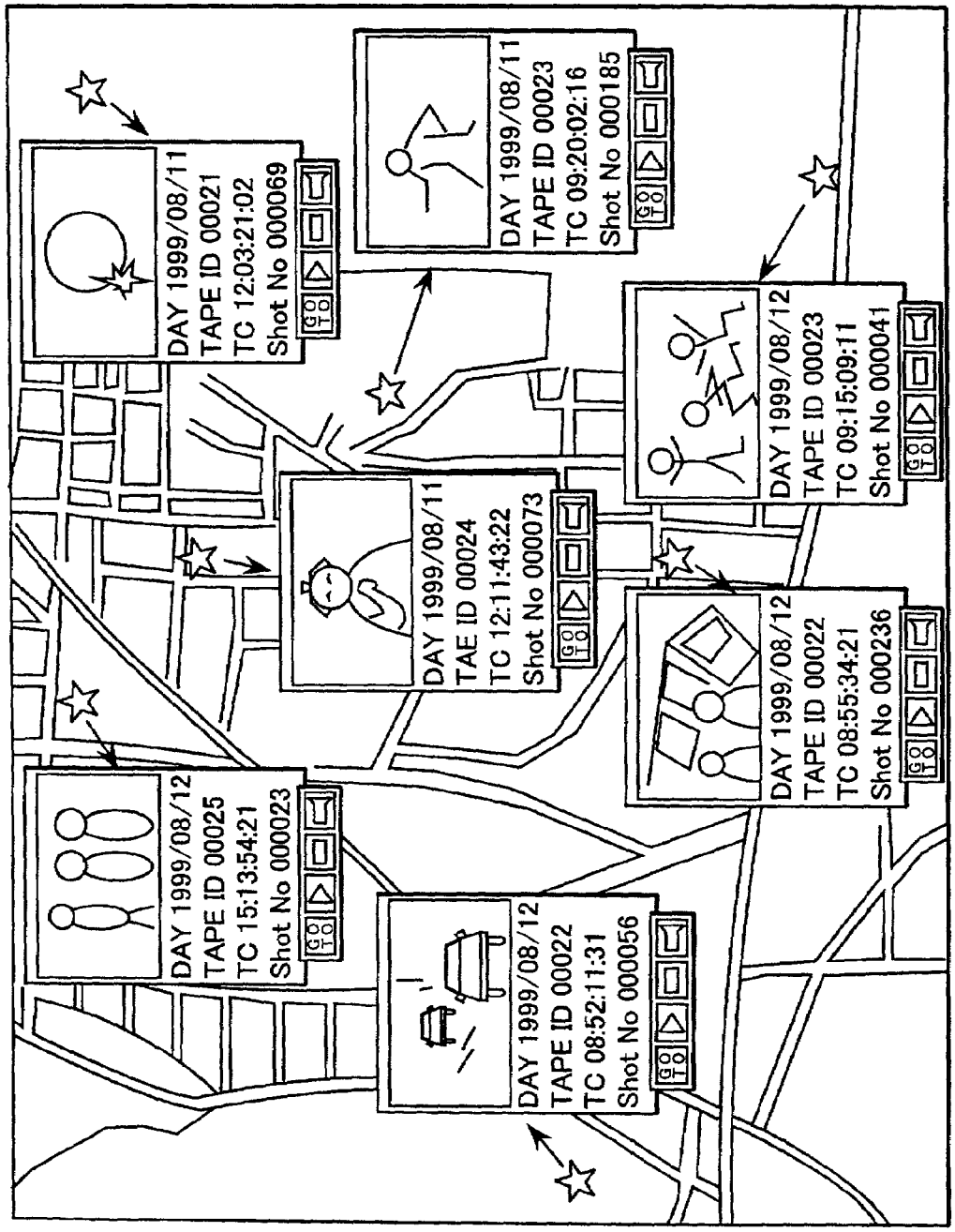
FIG. 20 is a diagram showing an example of the retrieval result display screen (a fourth example) according to a preferred embodiment of the present invention.

FIG. 20 shows a fourth example of the display screen. This display screen example is an example of a case where the display result is displayed in mapping form. That is, in this display screen example, the image data matching the retrieval condition is subjected to mapping onto the map and displayed.

When this display screen is available, the client terminal 1 user can retrieve desired image data from approximate geographical information and also use the display screen in another way by selecting those images of interest to the user from the registered simplified images regarding the displayed area.

According to the on-demand image delivery system described above, since any desired image data can be easily accessed from massive image resources stored in the image resource databases of a variety of business operators and organizations in many countries of the world, effective utilization of the image data resources can be realized. This also means that the utilization value of the image data resources can be increased even more.

In addition, as far as the client terminal user is concerned, inasmuch as necessary images can be easily obtained when needed, efficiency of the operation and improvement of the entertaining property can be brought about.

Further, the on-demand image delivery system can anticipate high effects especially when GPS information is included. That is, the visual retrieval method through mapping with map information and retrieval of the image data by pinpointing at the specified point (longitude, latitude, and altitude) at the specified time is rendered possible.

Moreover, insofar as the retrieval receiving screen and the retrieval result display screen, too, are concerned, there is an added advantage in that the respective intentions of the image delivery server side (image resource database side and the image delivery server side) and the client terminal side can be reflected, resulting in providing the image delivery server side (service providing side) with compatibility between differentiation from other service operators and information management. The client terminal side can also realize retrieving operation under the easy-to-use condition and positive exclusion of unnecessary information.

Finally, the configurations and structures of respective units and portions described specifically with respect to the preferred embodiments of the present invention are only examples of realization of the present invention, so the embodiments thereof should not be construed as to limiting the technical scope of the present invention.

What is claimed is:

1. An on-demand image delivery server delivering image data based on a request from a client terminal, said server having one or more retrieval items as a retrieval condition inputted from the client terminal, comprising:
 a retrieval function portion retrieving an image resource database; and
 a retrieval result displaying function portion displaying a view of simplified image data of image data matching said retrieval condition and/or data regarding a designated item among contents-related information attached to said image data, on a screen of the client terminal, for confirmation of contents of image data to be delivered,
 wherein the simplified image data is a function of capabilities of the client terminal,
 wherein the simplified image data is generated from original image data for displaying a retrieval result,
 wherein said contents-related information includes information with regard to location, object, situation, shooting point and shooting time of the retrieval result,
 wherein the retrieval result determines the image data to be delivered in accordance with the retrieval condition and difference information,
 wherein difference information is information indicating a difference or a plurality of differences in contents-related information attached to each image data,
 wherein said simplified image data matching said retrieval condition is mapped to a corresponding position on a map by using attached GPS information, and a result of said mapping is displayed on said client terminal.

2. The on-demand image delivery server according to claim 1, wherein said retrieval result displaying function portion determines said designated item based on a setting of an image resource database.

3. The on-demand image delivery server according to claim 1, wherein said retrieval result displaying function portion determines said designated item based on a setting of a device thereof.

4. The on-demand image delivery server according to claim 1, wherein said retrieval result displaying function portion determines said designated item based on a setting of said client terminal.

5. The on-demand image delivery server according to claim 1, wherein said contents-related information includes GPS information.

6. The on-demand image delivery server according to claim 1, wherein said image data can be delivered to a client terminal distinct from a client terminal issuing a retrieval request, based on a request from said client terminal issuing said retrieval request.

7. The on-demand image delivery server according to claim 1, wherein a retrieval item inputted from said client terminal includes position information and/or time information.

8. The on-demand image delivery server according to claim 1, wherein contents-related information of each image data is displayed according to a table form matching items subject to display.

9. An image resource database storing image data along with simplified image data thereof and/or contents-related information attached thereto, comprising:
- a retrieval execution portion outputting said simplified image data of said image data matching a retrieval condition and/or data regarding a designated item among contents-related information attached to said image data, when responding to an on-demand image delivery server in relation to a retrieval result,
- wherein the simplified image data is a function of capabilities of a client terminal,
- wherein the simplified image data is generated from original image data for displaying the retrieval result,
- wherein said contents-related information includes information with regard to location, object, situation, shooting point and shooting time of the retrieval result,
- wherein the retrieval result determines the image data to be delivered in accordance with the retrieval condition and difference information,
- wherein difference information is information indicating a difference or a plurality of differences in contents-related information attached to each image data, and
- wherein said simplified image data matching said retrieval condition is mapped to a corresponding position on a map by using attached GPS information, and a result of said mapping is displayed on said client terminal.

10. A client terminal receiving from an on-demand image delivery server and displaying on a screen, information on image data matching a retrieval condition, said client terminal comprising:
- a retrieval result display function portion outputting simplified image data of said image data matching said retrieval condition and/or data regarding a designated item among contents-related information attached to said image data which are notified from said on-demand image delivery server,
- wherein the simplified image data is a function of capabilities of the client terminal,
- wherein the simplified image data is generated from the original image data for displaying a retrieval result,
- wherein said contents-related information includes information with regard to location, object, situation, shooting point and shooting time of the retrieval result,
- wherein the retrieval result determines the image data to be delivered in accordance with the retrieval condition and difference information,
- wherein difference information is information indicating a difference or a plurality of differences in contents-related information attached to each image data, and
- wherein said simplified image data matching said retrieval condition is mapped to a corresponding position on a map by using attached GPS information, and a result of said mapping is displayed on said client terminal.

11. A server system having an on-demand image delivery server and an image resource database,
- wherein said on-demand image delivery server delivering image data based on a request from a client terminal, comprises:
- a retrieval execution portion retrieving said image resource database, and a retrieval result display function portion displaying on a screen of said client terminal for confirmation of contents of image data subject to delivery, simplified image data of said image data matching a retrieval condition and/or data regarding a designated item among contents-related information attached thereto; and
- said image resource database storing image data along with simplified image data thereof and/or contents-related information attached thereto, comprises:
- a retrieval execution portion outputting said simplified image data of said image data and/or data regarding a designated item among contents-related information attached to said image data, when responding to an on-demand image delivery server,
- wherein the simplified image data is a function of capabilities of the client terminal,
- wherein the simplified image data is generated from the original image data for displaying a retrieval result,
- wherein said contents-related information includes information with regard to location, object, situation, shooting point and shooting time of the retrieval result,
- wherein the retrieval result determines the image data to be delivered in accordance with the retrieval condition and difference information,
- wherein difference information is information indicating a difference or a plurality of differences in contents-related information attached to each image data, and
- wherein said simplified image data matching said retrieval condition is mapped to a corresponding position on a map by using attached GPS information, and a result of said mapping is displayed on said client terminal.

12. An on-demand image delivery system having an on-demand image delivery server, an image resource database and a client terminal, wherein said on-demand image delivery server delivering image data based on a request from said client terminal, comprises:
- a retrieval function portion retrieving said image resource database; and
- a retrieval result display function portion displaying on the screen of said client terminal for confirmation of contents of image data subject to delivery, simplified image data of said image data matching a retrieval condition and/or data regarding a designated item among contents-related information attached to said image data;
- said image resource database storing said image data along with simplified image data of said image data and/or contents-related information attached thereto, comprises:
- a retrieval execution portion outputting said simplified image data of said image data matching a retrieval condition and/or data regarding a designated item among contents-related information attached thereto, when responding to an on-demand image delivery server;
- and said client terminal receiving from said on-demand image delivery server and displaying on a screen, information on image data matching a retrieval condition, said client terminal comprises:
- a retrieval result display function portion outputting simplified image data of said image data matching said retrieval condition and/or data regarding a designated item among contents-related information attached to said image data which are notified from said on-demand image delivery server,
- wherein the simplified image data is a function of capabilities of the client terminal,
- wherein the simplified image data is generated from the original image data for displaying a retrieval result,
- wherein said contents-related information includes information with regard to location, object, situation, shooting point and shooting time of the retrieval result,
- wherein the retrieval result determines the image data to be delivered in accordance with the retrieval condition and difference information, wherein difference information is information indicating a difference or a plurality of differences in contents-related information attached to each image data, and wherein said simplified image data matching said retrieval condition is mapped to a corresponding position on a map by using attached GPS information, and a result of said mapping is displayed on said client terminal.

13. A retrieval result displaying method related to an on-demand image delivery system, said method comprising the steps of:

displaying a view of simplified image data of said image data matching a retrieval condition and/or data regarding an item set by an image resource database among contents-related information attached to said image data, on a screen of a client terminal, wherein the simplified image data is a function of capabilities of the client terminal, wherein the simplified image data is generated from the original image data for displaying a retrieval result, wherein said contents-related information includes information with regard to location, object, situation, shooting point and shooting time of the retrieval result, wherein the retrieval result determines the image data to be delivered in accordance with the retrieval condition and difference information, wherein difference information is information indicating a difference or a plurality of differences in contents-related information attached to each image data, and wherein said simplified image data matching said retrieval condition is mapped to a corresponding position on a map by using attached GPS information, and a result of said mapping is displayed on said client terminal.

14. A retrieval result displaying method related to an on-demand image delivery system comprising:

displaying a view of simplified image data of said image data matching a retrieval condition and/or data regarding an item set by an on-demand image delivery server among contents-related information attached to said image data, on a screen of a client terminal, wherein the simplified image data is a function of capabilities of the client terminal, wherein the simplified image data is generated from the original image data for displaying a retrieval result, wherein said contents-related information includes information with regard to location, object, situation, shooting point and shooting time of the retrieval result, wherein the retrieval result determines the image data to be delivered in accordance with the retrieval condition and difference information, wherein difference information is information indicating a difference or a plurality of differences in contents-related information attached to each image data, and wherein said simplified image data matching said retrieval condition is mapped to a corresponding position on a map by using attached GPS information, and a result of said mapping is displayed on said client terminal.

15. A retrieval result displaying method related to an on-demand image delivery system comprising:

displaying on a screen of a client terminal, simplified image data of said image data matching a retrieval condition and/or data regarding a designated item among contents-related information attached to said image data, according to matrix form corresponding to items to be displayed, wherein the simplified image data is a function of capabilities of the client terminal, wherein the simplified image data is generated from the original image data for displaying a retrieval result, wherein said contents-related information includes information with regard to location, object, situation, shooting point and shooting time of the retrieval result, wherein the retrieval result determines the image data to be delivered in accordance with the retrieval condition and difference information, wherein difference information is information indicating a difference or a plurality of differences in contents-related information attached to each image data, and wherein said simplified image data matching said retrieval condition is mapped to a corresponding position on a map by using attached GPS information, and a result of said mapping is displayed on said client terminal.

* * * * *